(12) United States Patent
Wu et al.

(10) Patent No.: US 11,272,491 B2
(45) Date of Patent: Mar. 8, 2022

(54) RESOURCE INDICATION METHOD, NETWORK DEVICE, AND TERMINAL DEVICE

(71) Applicant: Huawei Technologies Co., Ltd., Shenzhen (CN)

(72) Inventors: Ming Wu, Shenzhen (CN); Chi Zhang, Shanghai (CN); Yi Qin, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 16/580,888

(22) Filed: Sep. 24, 2019

(65) Prior Publication Data

US 2020/0022122 A1    Jan. 16, 2020

Related U.S. Application Data

(63) Continuation of application No. PCT/CN2018/080329, filed on Mar. 23, 2018.

(30) Foreign Application Priority Data

Mar. 24, 2017  (CN) .......................... 201710184946.1

(51) Int. Cl.
*H04W 72/04* (2009.01)
(52) U.S. Cl.
CPC ....... *H04W 72/042* (2013.01); *H04W 72/044* (2013.01)
(58) Field of Classification Search
CPC .......................... H04W 72/042; H04W 72/044
See application file for complete search history.

(56) References Cited

U.S. PATENT DOCUMENTS

2014/0233466 A1  8/2014  Pourahmadi et al.
2014/0293881 A1* 10/2014  Khoshnevis .......... H04L 5/0046
                                                      370/329
(Continued)

FOREIGN PATENT DOCUMENTS

CN    103200684 A    7/2013
CN    103313395 A    9/2013
(Continued)

OTHER PUBLICATIONS

"Discussion on DL DMRS design",3GPP TSG-RAN WG1 NR Ad-Hoc, Spokane, Washington, R1-1700806, pp. 1-6, 3rd Generation Partnership Project, Valbonne, France (Jan. 16-20, 2017).
(Continued)

*Primary Examiner* — Brenda H Pham
(74) *Attorney, Agent, or Firm* — Leydig, Voit & Mayer, Ltd.

(57) ABSTRACT

This application discloses a resource indication method, a network device, and a terminal device, to improve utilization of a resource mapped to a DMRS port. The method includes: sending, by a network device, configuration information to a terminal device, so that the terminal device determines, based on the configuration information, that a second resource in first resources is used to transmit first information or that a third resource in first resources is not used to transmit first information, where the first resources are resources mapped to a DMRS port. In this way, the terminal device can multiplex the resources mapped to the DMRS port. When some of the first resources are not used to transmit a DMRS, the resources may be indicated to determine whether the resources may be used to transmit the first information, for example, the first information may be data, control information, or other information different from DMRS information, thereby ensuring maximum use of the (Continued)

resources mapped to the DMRS port, and improving resource utilization.

16 Claims, 13 Drawing Sheets

(56) References Cited

U.S. PATENT DOCUMENTS

| | | | |
|---|---|---|---|
| 2016/0036542 A1 | 2/2016 | Gong et al. | |
| 2016/0323859 A1 | 11/2016 | Liu et al. | |
| 2018/0091276 A1* | 3/2018 | Huang | H04L 5/0051 |
| 2018/0131490 A1* | 5/2018 | Patel | H04W 72/042 |
| 2018/0316469 A1* | 11/2018 | Jiang | H04L 5/0021 |
| 2021/0092758 A1* | 3/2021 | Saito | H04W 72/0446 |

FOREIGN PATENT DOCUMENTS

| | | |
|---|---|---|
| CN | 104105120 A | 10/2014 |
| CN | 105122714 A | 12/2015 |
| EP | 3573274 A1 | 11/2019 |
| KR | 20110085887 A | 7/2011 |

OTHER PUBLICATIONS

"Design of DL DMRS for data transmission," 3GPP TSG RAN WG1 Meeting #88, Athens, Greece, R1-1701692, Athens, Greece, pp. 1-5, 3rd Generation Partnership Project, Valbonne, France (Feb. 13-17, 2017).

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.2.0, pp. 1-197, 3rd Generation Partnership Project, Valbonne, France (Mar. 2017).

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, pp. 1-273, 3rd Generation Partnership Project, Valbonne, France (Mar. 2017).

\* cited by examiner

DL DMRS port 1/5
DL DMRS port 2/6
DL DMRS port 3/7
DL DMRS port 4/8

DL DMRS port 1/3
DL DMRS port 2/4

DL DMRS port 1/3

DL DMRS port 1
DL DMRS port 2

DL DMRS port 1
DL DMRS port 2
DL DMRS port 3
DL DMRS port 4

DL DMRS port 5
DL DMRS port 6
DL DMRS port 7
DL DMRS port 8

DL DMRS port 1/9
DL DMRS port 2/10
DL DMRS port 3/11
DL DMRS port 4/12

DL DMRS port 5/13
DL DMRS port 6/14
DL DMRS port 7/15
DL DMRS port 8/16

RESOURCE INDICATION METHOD, NETWORK DEVICE, AND TERMINAL DEVICE

CROSS-REFERENCE TO RELATED APPLICATIONS

This application is a continuation of International Application No. PCT/CN2018/080329, filed on Mar. 23, 2018, which claims priority to Chinese Patent Application No. 201710184946.1, filed on Mar. 24, 2017. The disclosures of the aforementioned applications are hereby incorporated by reference in their entireties.

TECHNICAL FIELD

This application relates to the field of communications technologies, and in particular, to a resource indication method, a network device, and a terminal device.

BACKGROUND

In long term evolution advanced (English: Long Term Evolution Advanced, LTE-A for short), downlink data is modulated through orthogonal frequency division multiplexing (English: Orthogonal Frequency Division Multiplexing, OFDM for short), and uplink data is modulated through discrete Fourier transform spread orthogonal frequency division multiplexing (English: Discrete Fourier Transform spread Orthogonal Frequency Division Multiplexing, DFT-s-OFDM for short). In the LTE-A, a downlink demodulation reference signal (English: Demodulation Reference Signal, DMRS for short) corresponds to a maximum of eight ports (port) with corresponding port numbers 7 to 14. A downlink DMRS is mapped to discrete resource elements (English: Resource Element, RE for short) by using a pseudo-noise (English: Pseudo-noise, PN for short) sequence. Multiplexing is implemented between downlink DMRS ports through frequency division multiplexing (English: Frequency Division Multiplexing, FDM for short) and an orthogonal cover code (English: Orthogonal Cover Code, OCC for short). An uplink DMRS is mapped to the entire fourth and eleventh symbols of a physical resource block (English: Physical Resource Block, PRB for short). The uplink DMR may be multiplexed between different ports through a cyclic shift (English: cyclic shift, CS for short). In the LTE-A, considering a hardware capability of a terminal device, a peak to average power ratio (English:Peak to Average Power Ratio, PAPR for short) needs to be reduced when data is sent on an uplink. Therefore, a ZC (English full name: Zadoff-Chu) sequence is used for the uplink DMRS, and the uplink DMRS is mapped to an entire symbol.

In new radio (English: New Radio, NR for short), a hardware capability of a terminal device may be improved, and it is considered in NR design that an OFDM modulation method may also be used on an uplink. For uplink OFDM modulation and other requirements in the NR, a more suitable design needs to be used for an uplink DMRS.

There are two duplex modes in existing LTE: frequency division duplex (English: Frequency Domain Duplex, FDD for short) and time division duplex (English: Time Domain Duplex, TDD for short). In the FDD duplex mode, uplink communication and downlink communication are performed in different frequency bands. Therefore, there is no cross interference between uplink communication and downlink communication. In the TDD duplex mode, uplink communication and downlink communication are performed in a same frequency band but in different slots, and uplink-downlink configurations of neighboring cells are the same. Therefore, there is also no cross interference between uplink communication and downlink communication. To adapt to services of different cells and improve a system throughput, dynamic TDD, flexible duplex, and even full duplex technologies may be introduced into a new radio NR communications system. In a dynamic TDD system, uplink-downlink configurations of different cells may be different, and information transmission directions in neighboring cells are different, leading to cross interference between uplink communication and downlink communication (as shown in FIG. 1), to be specific, interference between transmitting and receiving points (English: Transmitting and receiving point, TRP for short) and interference between user equipments (English: User Equipment, UE for short). Because a transmit power of a network device is usually relatively large, and base stations are relatively high, a line-of-sight transmission probability of a signal between the base stations is higher. Therefore, the interference between the TRPs is relatively strong. In addition, two UEs at edges of neighboring cells may be closer. In this case, interference between the UEs is relatively strong. Therefore, cross interference may be stronger than original codirectional interference.

A DMRS is used for channel estimation, and correct demodulation of a DMRS is vital for correct demodulation of data. If a dynamic TDD, flexible duplex, or full duplex service is used in a wireless communications system, strong cross interference may exist between cells, and the DMRS possibly cannot be correctly demodulated. Therefore, during design of uplink and downlink DMRSs, preventing the DMRSs from suffering strong cross interference needs to be considered.

In a 3rd generation partnership project (English: 3rd Generation Partnership Project, 3GPP for short) conference standard, uplink and downlink DMRSs are symmetrically designed. When CP-OFDM modulation is used for both an uplink and a downlink, in the NR, that the downlink (English: Downlink, DL for short) and the uplink (English: Uplink, UL for short) have a same DMRS structure needs to be supported at least, and DL and UL DMRSs on different links may be configured orthogonally to each other.

There is no cross interference in the LTE-A, and uplink and downlink DMRSs do not need to be configured orthogonally to each other. In addition, DMRSs of a plurality of users that are transmitted through MU-MIMO are all mapped to a same RE (where ports 7, 8, 11, and 13 are all mapped to a same RE). Therefore, an RE resource mapped to no DMRS may be used to transmit data, and does not need to be indicated.

It can be learned according to consensus reached in an NR standard discussion process and a DL DMRS design of each company that, uplink and downlink DMRSs on links (cross links) of different transmission directions are orthogonal through FDM or TDM. When the uplink and downlink DMRSs on the cross links are orthogonal through FDM or TDM, an RE on a downlink that corresponds to an RE to which a DMRS is mapped on an uplink cannot transmit data or another reference signal (English: Reference Signal, RS for short) (that is, the RE resource is muted), and vice versa. For a single uplink or downlink, no DMRS is transmitted on remaining resources in all resources that may be mapped to a DMRS, except resources corresponding to a DMRS port configured by a base station. The remaining resources may be considered as resources, mapped to no DMRS, in all the resources that may be mapped to the DMRS port where all the resources that may be mapped to the DMRS port may include basic DMRS resources, or may include basic DMRS resources and additional DMRS resources. For the resources, mapped to no DMRS, in all the resources that may be mapped to the DMRS port, only some resources can transmit data information, another reference signal, control information, or any two or more of the foregoing information. Alternatively, for the resources, mapped to no DMRS, in all the resources that may be mapped to the DMRS port, only some resources are not used to transmit any information. That is, the resources are muted. This depends on a quantity of uplink and downlink DMRS ports that need to be orthogonal. If it is specified in a protocol that the resources, mapped to no DMRS, in all the resources that may be mapped to the DMRS port are definitely used to transmit other information, uplink and downlink DMRS orthogonality may be affected. If it is specified that the resources, mapped to no DMRS, in all the resources that may be mapped to the DMRS port are definitely not used to transmit other information, a waste of resources may be caused.

Therefore, how to indicate uplink and downlink DMRS resources needs to be resolved.

SUMMARY

This application provides a resource indication method, a network device, and a terminal device, to improve uplink and downlink DMRS resource utilization.

According to a first aspect, this application provides a resource indication method. The method includes:

receiving, by a terminal device, configuration information sent by a network device;

determining, by the terminal device based on the configuration information, that a second resource in first resources is used to transmit first information or that a third resource in first resources is not used to transmit first information, where the first resources are resources mapped to a DMRS port.

In this application, the network device sends the configuration information to the terminal device, so that the terminal device determines, based on the configuration information, that the second resource in the first resources is used to transmit the first information or that the third resource in the first resources is not used to transmit the first information, where the first resources are resources mapped to a DMRS port. In this way, the terminal device can multiplex the resources mapped to the DMRS port. When some of the first resources are not used to transmit a DMRS, the resources may be indicated to determine whether the resources may be used to transmit the first information, for example, the first information may be data, control information, or other information different from DMRS information, thereby ensuring maximum use of the resources mapped to the DMRS port, and improving resource utilization.

Optionally, the configuration information includes first configuration information, the first configuration information is first indication information or second indication information, the first indication information indicates that the second resource in the first resources is used to transmit the first information, and the second indication information indicates that the third resource in the first resources is not used to transmit the first information.

Optionally, the configuration information includes first configuration information and second configuration information, the first configuration information is first indication information or second indication information, the first indication information indicates that the second resource in the first resources is used to transmit the first information, the second indication information instructs the terminal device to receive the second configuration information, and the second configuration information is used to indicate that the second resource in the first resources is used to transmit the first information, or determine that the third resource in the first resources is not used to transmit the first information.

Optionally, the configuration information includes first configuration information, and when a configuration indicated by the first configuration information belongs to a first configuration set, the first configuration information indicates that the second resource in the first resources is used to transmit the first information.

Optionally, the first configuration set includes some or all of the following configurations:

a configuration in which a quantity of spatial layers of DMRSs is greater than N, where N is a positive integer; and a configuration of an additional DMRS.

Optionally, the second resource is some or all of the first resources except a fourth resource, the third resource is some or all of the first resources except the fourth resource, and the fourth resource is a resource corresponding to a DMRS port indicated by a DMRS port configuration received by the terminal device.

Optionally, the first resources are mapped to at least two time domain symbols, the first resources include a resource mapped to a first symbol in the at least two time domain symbols and a resource mapped to a second symbol in the at least two time domain symbols, resources that are in the first resources except the fourth resource and that are mapped to the first symbol are fifth resources, resources that are in the first resources except the fourth resource and that are mapped to the second symbol are sixth resources, and the second resource is some or all of the fifth resources or the second resource is some or all of the sixth resources.

Optionally, the first information is at least one of the following information: data information, control information, and another reference signal different from a DMRS.

According to a second aspect, this application provides a terminal device. In a possible design, the terminal device includes a plurality of functional modules, configured to implement the resource indication method according to any implementation of the first aspect. The terminal device receives configuration information sent by a network device, so that the terminal device determines, based on the configuration information, that a second resource in first resources is used to transmit first information or that a third resource in first resources is not used to transmit first information, where the first resources are resources mapped to a DMRS port. In this way, the terminal device can multiplex the resources mapped to the DMRS port. When some of the first resources are not used to transmit a DMRS, the resources may be indicated to determine whether the resources may be used to transmit the first information, for example, the first information may be data, control information, or other information different from DMRS information, thereby ensuring maximum use of the resources mapped to the DMRS port, and improving resource utilization.

In a possible design, a structure of the terminal device includes a processor and a transceiver. The processor is configured to support the terminal device in executing a corresponding function in the resource indication method according to the first aspect. The transceiver is configured to support communication between the terminal device and the network device, and receive information or an instruction that is sent by the network device and that is in the foregoing resource indication method. The terminal device may further include a memory. The memory is configured to couple with the processor, and the memory stores a program instruction and data that are necessary to the terminal device.

According to a third aspect, this application provides a resource indication method. The method includes:

sending, by a network device, configuration information to a terminal, where the configuration information is used by the terminal device to determine, based on the configuration information, that a second resource in first resources is used to transmit first information or that a third resource in first resources is not used to transmit first information, and the first resources are resources mapped to a DMRS port.

Optionally, the configuration information includes first configuration information, the first configuration information is first indication information or second indication information, the first indication information indicates that the second resource in the first resources is used to transmit the first information, and the second indication information indicates that the third resource in the first resources is not used to transmit the first information.

Optionally, the configuration information includes first configuration information and second configuration information, the first configuration information is first indication information or second indication information, the first indication information indicates that the second resource in the first resources is used to transmit the first information, the second indication information instructs the terminal device to receive the second configuration information, and the second configuration information is used to indicate that the second resource in the first resources is used to transmit the first information, or determine that the third resource in the first resources is not used to transmit the first information.

Optionally, the configuration information includes first configuration information, and when a configuration indicated by the first configuration information belongs to a first configuration set, the first configuration information indicates that the second resource in the first resources is used to transmit the first information.

Optionally, the first configuration set includes some or all of the following configurations:

a configuration in which a quantity of spatial layers of DMRSs is greater than N, where N is a positive integer; and a configuration of an additional DMRS.

Optionally, the second resource is some or all of the first resources except a fourth resource, the third resource is some or all of the first resources except the fourth resource, and the fourth resource is a resource corresponding to a DMRS port indicated by a DMRS port configuration received by the terminal device.

Optionally, the first resources are mapped to at least two time domain symbols, the first resources include a resource mapped to a first symbol in the at least two time domain symbols and a resource mapped to a second symbol in the at least two time domain symbols, resources that are in the first resources except the fourth resource and that are mapped to the first symbol are fifth resources, resources that are in the first resources except the fourth resource and that are mapped to the second symbol are sixth resources, and the second resource is some or all of the fifth resources or the second resource is some or all of the sixth resources.

Optionally, the first information is at least one of the following information: data information, control information, and another reference signal different from a DMRS.

According to a fourth aspect, this application provides a network device. In a possible design, the network device includes a plurality of functional modules, configured to implement the resource indication method according to any implementation of the third aspect. The network device sends configuration information to a terminal device, so that the terminal device determines, based on the configuration information, that a second resource in first resources is used to transmit first information or that a third resource in first resources is not used to transmit first information, where the first resources are resources mapped to a DMRS port. In this way, the terminal device can multiplex the resources mapped to the DMRS port. When some of the first resources are not used to transmit a DMRS, the resources may be indicated to determine whether the resources may be used to transmit the first information, for example, the first information may be data, control information, or other information different from DMRS information, thereby ensuring maximum use of the resources mapped to the DMRS port, and improving resource utilization.

In a possible design, a structure of the network device includes a processor and a transceiver. The processor is configured to support the terminal device in executing a corresponding function in the resource indication method according to the third aspect. The transceiver is configured to support communication between the network device and the terminal device, and send, to the terminal device, information or an instruction that is in the foregoing resource indication method. The network device may further include a memory. The memory is configured to couple with the processor, and the memory stores a program instruction and data that are necessary to the network device.

According to a fifth aspect, an embodiment of this application provides a computer storage medium, configured to store computer software instructions used by the terminal device according to the second aspect and the network device according to the fourth aspect. The computer storage medium includes programs respectively designed for performing the first aspect and the third aspect.

According to a sixth aspect, this application further provides a computer program product that includes an instruction. When the computer program product is run on a computer, the computer is enabled to perform the methods according to the first aspect and the third aspect.

DESCRIPTION OF EMBODIMENTS

To make the objectives, technical solutions, and advantages of this application clearer, the following further describes this application in detail with reference to the accompanying drawings.

Embodiments of this application may be applied to an existing cellular communications system, for example, a global system for mobile communications (English full name: Global System for Mobile Communications, GSM for short), a wideband code division multiple access (English full name: Wideband Code Division Multiple Access, WCDMA for short) system, and a long term evolution (English full name: Long Term Evolution, LTE for short) system. In addition, the embodiments of this application are also applicable to a future wireless communications system, and applicable to a 5G system (fifth-generation mobile communications system) such as an NR-based access network, a cloud radio access network (English: Cloud Radio Access Network, CRAN for short), or another communications system. The embodiments of this application may be further extensively applicable to similar wireless communications systems, for example, wireless fidelity (English: Wireless-Fidelity, Wi-Fi for short), a worldwide interoperability for microwave access (Worldwide Interoperability for Microwave Access, WiMAX for short), and a 3GPP-related cellular system.

Figure 1:
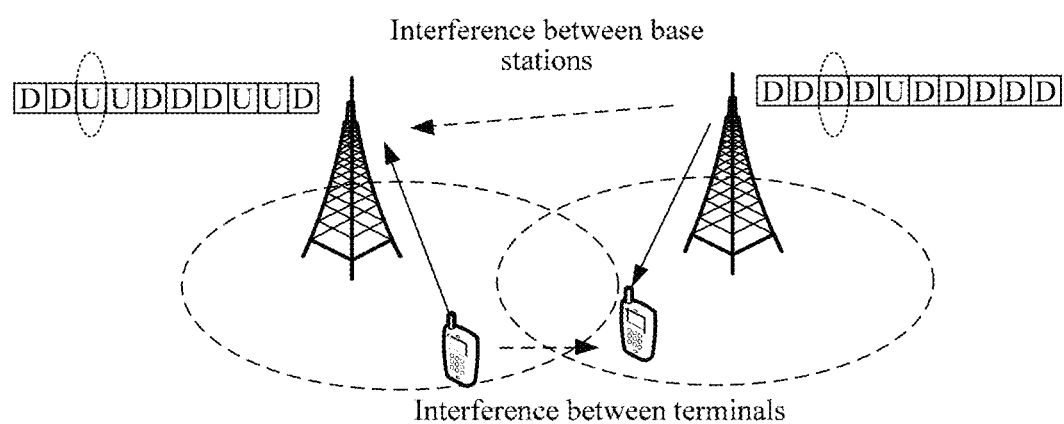
FIG. 1 is a schematic diagram of uplink and downlink cross interference between neighboring cells according to this application.
Figure 2:
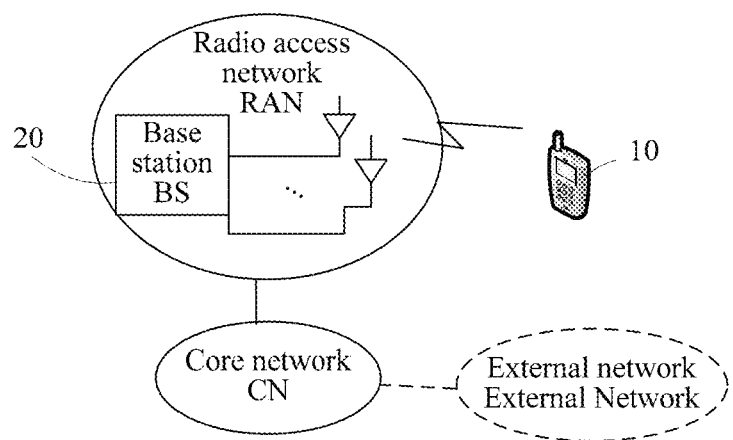
FIG. 2 is a schematic diagram of an application scenario applicable to this application.

FIG. 2 is a schematic diagram of an application scenario to which this application is applicable. Network architectures and service scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are also applicable to a similar technical problem.

FIG. 2 is a schematic diagram of a possible application scenario according to the present invention, where the application scenario includes communication between at least one user equipment UE 10 and a radio access network (English: Radio access network, RAN for short). The RAN includes at least one base station 20 (English: base station, BS for short). For clarity, only one base station and one UE are shown in the figure. The RAN is connected to a core network (English: core network, CN for short). Optionally, the CN may be coupled to one or more external networks (External Network), for example, the Internet and a public switched telephone network (English: public switched telephone network, PSTN for short).

For ease of understanding, some nouns used in this application are described below.

(1) A terminal device, also referred to as user equipment (User Equipment, UE) or a terminal, is a device that provides a user with voice and/or data connectivity, for example, a handheld device or an in-vehicle device having a wireless connection function. Common terminals include, for example, a mobile phone, a tablet computer, a notebook computer, a palmtop computer, a mobile Internet device (mobile internet device, MID), and a wearable device, such as a smartwatch, a smart band, or a pedometer.

(2) A network device, which, for example, may be a base station that is also referred to as a radio access network (English: Radio Access Network, RAN for short) device, is a device connecting a terminal to a wireless network, and includes, but is not limited to, an evolved NodeB (English: evolved NodeB, eNB for short), a radio network controller (English: radio network controller, RNC for short), a NodeB (English: NodeB, NB for short), a base station controller (English: Base Station Controller, BSC for short), a base transceiver station (English: Base Transceiver Station, BTS for short), a home NodeB (for example, Home evolved NodeB or Home NodeB, HNB for short), a baseband unit (English: BaseBand Unit, BBU for short), a gNodeB (English: gNodeB, gNB for short), a transmitting and receiving point (English: Transmitting and receiving point, TRP for short), and a transmitting point (English: Transmitting point, TP for short). In addition, the network device may further include a Wi-Fi access point (English: Access Point, AP for short).

It should be noted that a time unit in this application may be a slot, a transmission time interval (English: Transmission Time Interval, TTI for short), a subframe, a slot (slot), or a mini-slot.

In this application, an antenna port is also referred to as a port. A plurality of nouns having a same meaning are used alternately but represent a same meaning.

In a standard in NR, a DL DMRS port is multiplexed by using multiplexing methods such as FDM (including a comb (comb) structure), code division multiplexing (English: Code Division Multiplexing, CDM for short) (including an OCC and a CS), and time division multiplexing (English: Time Division Multiplexing, TDM for short). Specific uplink and downlink DMRS designs are still not determined. The following describes main designs of various DL DMRSs in basic forms. (For a high-speed scenario or the like, an additional (additional) DMRS is added to ensure more accurate channel estimation).

Figure 3A:
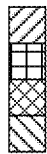
FIG. 3(a) shows a single-symbol DMRS design.
Figure 3A:
Figure 3A:
Figure 3A:
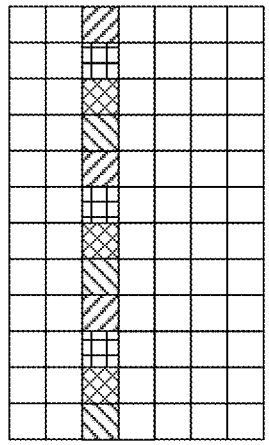
Figure 3A:
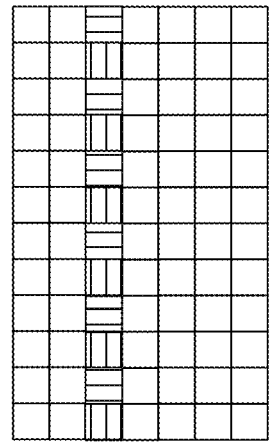
Figure 3A:
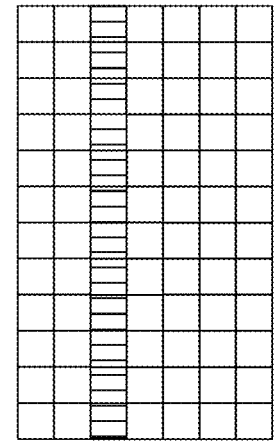

FIG. 3(a) shows a single-symbol DMRS design, where a single-symbol DL DMRS design mainly includes three comb structures respectively having comb-tooth intervals of 4, 2, and 1, and respectively corresponding to the first, the second, and the third figures from left to right. For the design with the comb-tooth interval of 4, frequency division multiplexing is performed on the first, the second, the third, and the fourth ports through FDM. That is, the ports 1, 2, 3, and 4 respectively occupy different REs. Ports 5, 6, 7, and 8 are multiplexed through CDM based on the ports 1, 2, 3, and 4, where the CDM may be an OCC or a cyclic shift. Eight DMRS ports may be multiplexed on one symbol in the design. For the design with the comb-tooth interval of 2, the first and the second ports are multiplexed through FDM, and the third and the fourth ports are multiplexed through CDM based on the first and the second ports. Four DMRS ports may be multiplexed on one symbol in the design. For the design with the comb-tooth interval of 1, the first and the second ports are multiplexed through CDM. Two ports may be multiplexed on one symbol in the design.

Figure 3B:
FIG. 3(b) shows a two-symbol DMRS design.
Figure 3B:
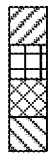
Figure 3B:
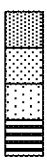
Figure 3B:
Figure 3B:
Figure 3B:
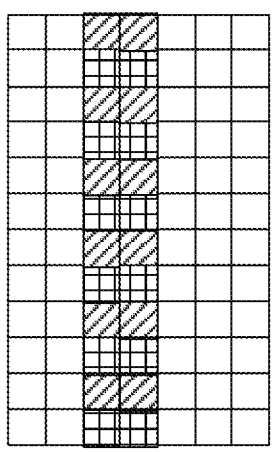
Figure 3B:
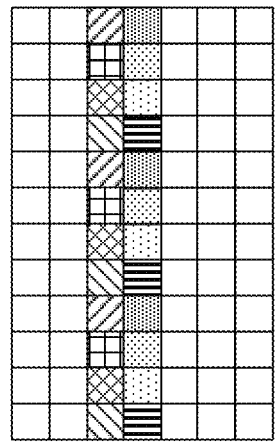
Figure 3B:
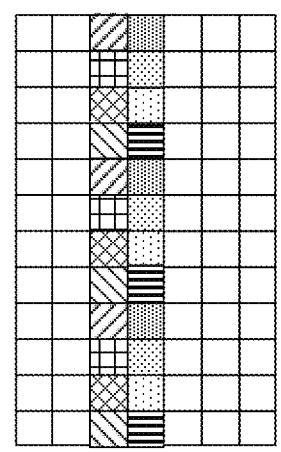

FIG. 3(b) shows a two-symbol DMRS design, where from left to right, the first figure is a design with a comb-tooth interval of 2. The first and the second ports are multiplexed through FDM. In this case, two symbols are occupied. The third and the fourth ports are multiplexed through CDM based on the first and the second ports. The second figure shows a design with a comb-tooth interval of 4. The first, the second, the third, and the fourth ports are multiplexed through FDM on the first symbol, and the fifth, the sixth, the seventh, and the eighth ports are multiplexed through FDM on the second symbol. Eight DMRS ports are multiplexed on two symbols in the design. The third figure shows a design with comb teeth of 4, and an FDM+CDM+TDM multiplexing method is used. The first to the eighth ports are multiplexed on two symbols through FDM plus TDM, and the ninth to the sixteenth ports are multiplexed through CDM on REs for the first to the eighth ports. Sixteen ports are multiplexed on two symbols in the design.

Figure 4A:
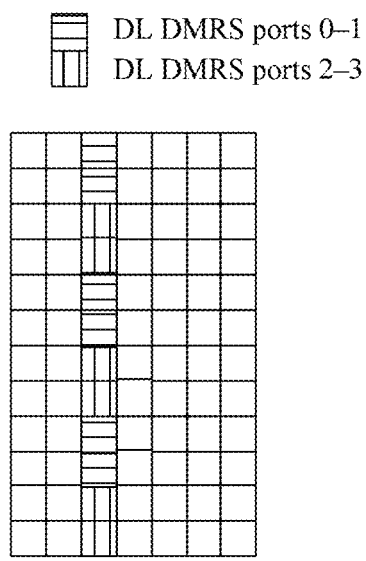
FIG. 4(a) and FIG. 4(b) show a single-symbol DMRS design.
Figure 4B:
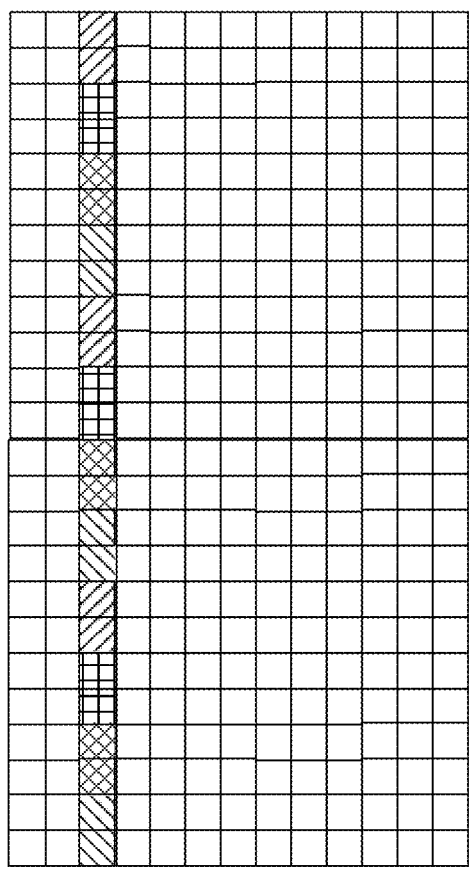

FIG. 4(a) and FIG. 4(b) show a single-symbol DMRS design. For a design (a), four DMRS ports are multiplexed on one symbol, where multiplexing may be performed between ports 0 and 1 and ports 2 and 3 through FDM or CDM. For a design (b), eight DMRS ports are multiplexed on one symbol, but the eight ports are designed on two RBs (24 subcarriers in frequency domain) in the design. Ports 0, 2, 4, and 6 are multiplexed through FDM, and multiplexing may be performed between ports 1, 3, 5, and 7 and ports 0, 2, 4, and 6 respectively through CDM or FDM.

Figure 5:
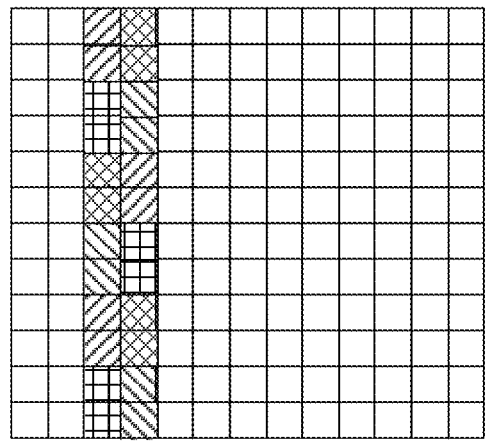
FIG. 5 shows a two-symbol DMRS design.
Figure 6:
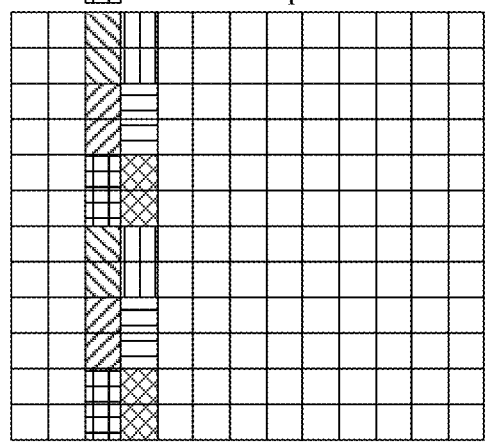
FIG. 6 shows a two-symbol DMRS design.

FIG. 5 and FIG. 6 show two-symbol DMRS designs. FIG. 5 shows that eight DMRS ports are multiplexed on two symbols, where OCC or FDM having a frequency domain length of 2 may be used for two consecutive REs having same lines. FIG. 6 shows that 12 DMRS ports are multiplexed on two symbols.

All DL DMRS ports use a method combining FDM, CDM (including an OCC and a cyclic shift), and TDM. In LTE-A, completely different designs are used for uplink and downlink DMRSs, while in the NR, at least for CP-OFDM, a same DMRS structure is used for both an uplink and a downlink, and uplink and downlink DMRSs on links of different transmission directions may be configured orthogonally to each other. To support quick data demodulation, a DMRS is supported to be placed before a data part in the NR, that is, a DMRS design needs to satisfy a front-loaded (Front-loaded) principle. A front-loaded DMRS is mapped to one or two consecutive OFDM symbols. In addition, for a front-loaded DMRS, one symbol supports multiplexing of four DMRS ports, and two symbols support multiplexing of eight DMRS ports. This needs to be further determined.

In the LTE-A, a downlink DMRS corresponds to a maximum of eight ports with corresponding port numbers 7 to 14. An OCC corresponding to each port is shown in Table 1.

TABLE 1

Correspondence table between a port and an OCC

| Antenna port (p) | $[\overline{W}_p(0)\overline{W}_p(1)\overline{W}_p(2)\overline{W}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] | p is an antenna port (port) corresponding to the DMRS, and $w_p(1')$ is an OCC corresponding to a port whose port number is p.

Figure 7:
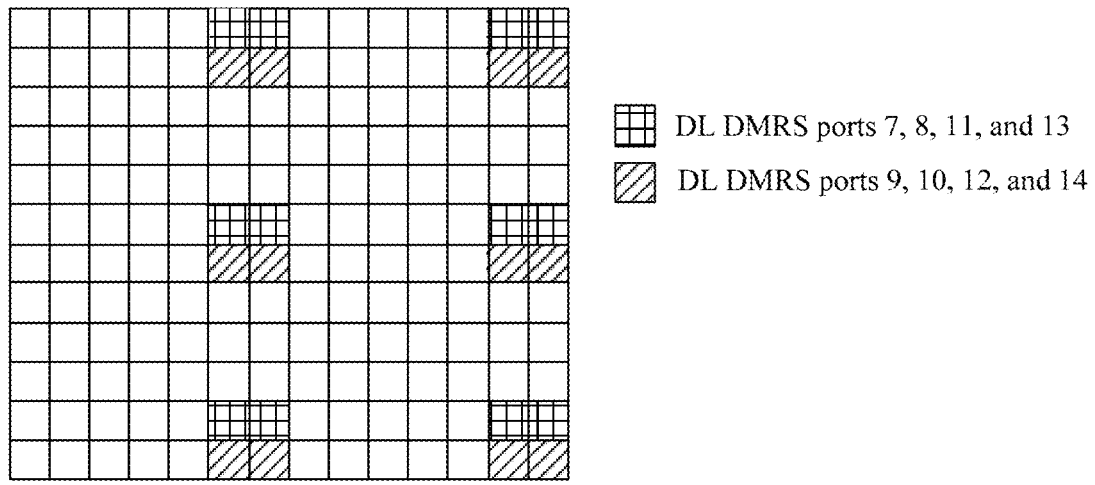
FIG. 7 shows a manner of mapping a downlink DMRS port in LTE.

A location of an RE to which a downlink DMRS is mapped is shown in FIG. 7, where ports {7, 8, 11, 13} are mapped to a same resource element (RE), and ports {9, 10, 12, 14} are mapped to a same RE.

In a protocol 36.212, a format (Format) 2C in downlink control information (English: Downlink control information, DCI for short) indicates a DMRS antenna port, a scrambling ID, and a corresponding layer quantity. Indication tables are shown by Table 2(a) (from Table 5.3.3.1.5C-1 in the protocol 36.212) and Table 2(b) (from Table 5.3.3.1.5C-2 in the protocol 36.212):

TABLE 2(a)

Indication table for an antenna port, a scrambling ID, and a layer quantity

| One codeword (Codeword): A codeword 0 is available, and a codeword 1 is unavailable. | | Two codewords (Codeword): A codeword 0 is available, and a codeword 1 is available. | |
|---|---|---|---|
| Value | Information | Value | Information |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 2(b)

Indication table for an antenna port, a scrambling ID, and a layer quantity

| One codeword (Codeword): A codeword 0 is available, and a codeword 1 is unavailable. | | Two codewords (Codeword): A codeword 0 is available, and a codeword 1 is available. | |
|---|---|---|---|
| Value | Information | Value | Information |
| 0 | 1 layer, port 7, $n_{SCID} = 0$ (OCC = 2) | 0 | 2 layers, ports 7-8, $n_{SCID} = 0$ (OCC = 2) |
| 1 | 1 layer, port 7, $n_{SCID} = 1$ (OCC = 2) | 1 | 2 layers, ports 7-8, $n_{SCID} = 1$ (OCC = 2) |

TABLE 2(b)-continued

Indication table for an antenna port, a scrambling ID, and a layer quantity

| One codeword (Codeword): A codeword 0 is available, and a codeword 1 is unavailable. | | Two codewords (Codeword): A codeword 0 is available, and a codeword 1 is available. | |
|---|---|---|---|
| Value | Information | Value | Information |
| 2 | 1 layer, port 8, $n_{SCID}$ = 0 (OCC = 2) | 2 | 2 layers, ports 7-8, $n_{SCID}$ = 0 (OCC = 4) |
| 3 | 1 layer, port 8, $n_{SCID}$ = 1 (OCC = 2) | 3 | 2 layers, ports 7-8, $n_{SCID}$ = 1 (OCC = 4) |
| 4 | 1 layer, port 7, $n_{SCID}$ = 0 (OCC = 4) | 4 | 2 layers, ports 11 and 13, $n_{SCID}$ = 0 (OCC = 4) |
| 5 | 1 layer, port 7, $n_{SCID}$ = 1 (OCC = 4) | 5 | 2 layers, ports 11 and 13, $n_{SCID}$ = 1 (OCC = 4) |
| 6 | 1 layer, port 8, $n_{SCID}$ = 0 (OCC = 4) | 6 | 3 layers, ports 7-9 |
| 7 | 1 layer, port 8, $n_{SCID}$ = 1 (OCC = 4) | 7 | 4 layers, ports 7-10 |
| 8 | 1 layer, port 11, $n_{SCID}$ = 0 (OCC = 4) | 8 | 5 layers, ports 7-11 |
| 9 | 1 layer, port 11, $n_{SCID}$ = 1 (OCC = 4) | 9 | 6 layers, ports 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Table 2(a) shows an indication method in an earlier LTE-A release version, and Table 2(b) shows an indication method newly added in a newer LTE-A release version.

It can be learned from the two indication tables that, in a case of single-user multiple-input multiple-output (English: single-user Multiple-Input Multiple-Output, SU-MIMO for short), a plurality of layers (or a plurality of ports) are used for a DL DMRS, starting from a lowest port. For example, in Table 2(a), two layers correspond to ports 7 and 8, three layers correspond to ports 7 to 9, four layers correspond to ports 7 to 10, and five layers correspond to ports 7 to 11 . . . .

In a case of one codeword (codeword) in Table 2(a), values 0, 1, 2, and 3 of the codeword corresponding to one layer include a plurality of cases. For example, the port 7 or the port 8 may be used and a scrambling ID nSCID may be 0 or 1. This case is for a multi-user multiple-input multiple-output (English: Multi-user Multiple-Input Multiple-Output, MU-MIMO for short) configuration.

Figure 8:
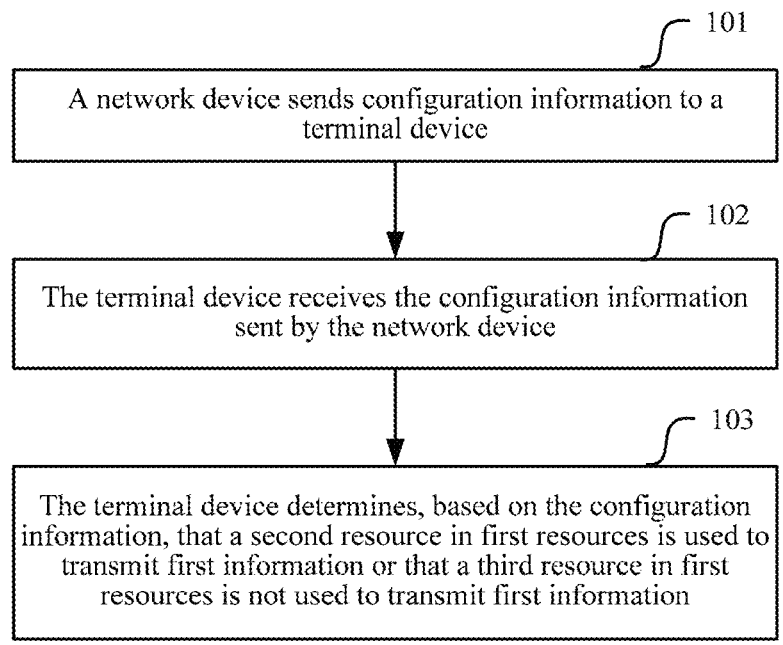
FIG. 8 is a flowchart of a resource indication method according to this application.

As shown in FIG. 8, this application provides a resource indication method. The method includes the following steps.

Step 101. A network device sends configuration information to a terminal device.

Step 102. The terminal device receives the configuration information sent by the network device.

Step 103. The terminal device determines, based on the configuration information, that a second resource in first resources is used to transmit first information or that a third resource in first resources is not used to transmit first information.

That the second resource in the first resources may be used to transmit the first information means that some resources that are in resources for transmitting a DMRS and that are currently not used may be multiplexed, that is, used to transmit the first information. The first information is data information, control information, or other reference information different from the DMRS. That the third resource in the first resources is not used to transmit the first information means that some resources that are in the resources for transmitting the DMRS and that are currently not used cannot be multiplexed, that is, cannot be used to transmit the first information.

The first resources are resources mapped to a DMRS port.

Optionally, the first information is at least one of the following information: data information, control information, and another reference signal different from the DMRS.

Optionally, the second resource may be some or all of the first resources except a fourth resource, the third resource is some or all of the first resources except the fourth resource, and the fourth resource is a resource corresponding to a DMRS port indicated by a DMRS port configuration received by the terminal device.

Alternatively, it may be that, the first resources are mapped to at least two time domain symbols, the first resources include a resource mapped to a first symbol in the at least two time domain symbols and a resource mapped to a second symbol in the at least two time domain symbols, resources that are in the first resources except the fourth resource and that are mapped to the first symbol are fifth resources, resources that are in the first resources except the fourth resource and that are mapped to the second symbol are sixth resources, and the second resource is some or all of the fifth resources or the second resource is some or all of the sixth resources.

Descriptions are provided below separately by using several specific implementation methods.

Method 1. The configuration information includes first configuration information, the first configuration information is first indication information or second indication information, the first indication information indicates that the second resource in the first resources is used to transmit the first information, and the second indication information indicates that the third resource in the first resources is not used to transmit the first information.

In Method 1, the network device sends the configuration information to the terminal device. When the first configuration information in the configuration information is the first indication information, the terminal device determines that the second resource in the first resources is used to transmit the first information, and therefore, can transmit the first information on the second resource. When the first configuration information in the configuration information is the second indication information, the terminal device determines that the third resource in the first resources is not used to transmit the first information, and therefore, does not use the third resource to transmit the first information.

For example, the first configuration information may be one-bit signaling. When the first configuration information is 0 (where 0 represents the first indication information), it indicates that the terminal device can transmit the first information on the second resource in the first resources.

When the first configuration information is 1 (where 1 represents the second indication information), it indicates that the terminal device cannot transmit the first information on the third resource in the first resources.

Certainly, alternatively, when the first configuration information is 1 (where 1 represents the first indication information), it indicates that the terminal device can transmit the first information on the second resource in the first resources. When the first configuration information is 0 (where 0 represents the second indication information), it indicates that the terminal device cannot transmit the first information on the third resource in the first resources.

In this way, in the method, the first configuration information is used to explicitly indicate that the terminal device can transmit the first information on the second resource in the first resources or explicitly indicate that the terminal device cannot transmit the first information on the third resource in the first resources.

Method 2. The configuration information includes first configuration information and second configuration information, the first configuration information is first indication information or second indication information, the first indication information indicates that the second resource in the first resources is used to transmit the first information, the second indication information instructs the terminal device to receive the second configuration information, and the second configuration information is used to indicate that the second resource in the first resources is used to transmit the first information, or determine that the third resource in the first resources is not used to transmit the first information.

In Method 2, the network device sends the configuration information to the terminal device. When the first configuration information in the configuration information is the first indication information, the terminal device determines that the second resource in the first resources is used to transmit the first information, and therefore, can transmit the first information on the second resource. When the first configuration information in the configuration information is the second indication information, the terminal device continues to receive the second configuration information sent by the network device, where the second configuration information is used to indicate that the second resource in the first resources is used to transmit the first information, or determine that the third resource in the first resources is not used to transmit the first information. For example, the second configuration information may further include third indication information and fourth indication information, where the third indication information indicates that the second resource in the first resources is used to transmit the first information, and the fourth indication information indicates that the third resource in the first resources is not used to transmit the first information. Therefore, when the terminal device receives the third indication information, the terminal device determines that the second resource in the first resources is used to transmit the first information, and therefore, can transmit the first information on the second resource. When the terminal device receives the fourth indication information, the terminal device determines that the third resource in the first resources is not used to transmit the first information, and therefore, does not use the third resource to transmit the first information.

In Method 2, it also explicitly indicates that the terminal device can transmit the first information on the second resource in the first resources or explicitly indicates that the terminal device cannot transmit the first information on the third resource in the first resources. A difference between Method 2 and Method 1 is that, the second configuration information is further included in Method 2. That is, when the first configuration information is the second indication information, the terminal device further receives the second configuration information, and determines, based on an indication of the second configuration information, that the second resource in the first resources is used to transmit the first information or that the third resource in the first resources is not used to transmit the first information.

Method 3. The configuration information includes first configuration information, and when a configuration indicated by the first configuration information belongs to a first configuration set, the first configuration information indicates that the second resource in the first resources is used to transmit the first information.

Optionally, the first configuration set includes one or more of the following: a configuration in which a quantity of spatial layers of DMRSs is greater than N (where N is a positive integer) and a configuration of an additional DMRS.

In Method 3, when the first configuration information sent by the network device to the terminal device belongs to the first configuration set, the terminal device can directly determine that the second resource in the first resources may be used to transmit the first information. Therefore, the terminal device may use the second resource in the first resources to transmit the first information.

In Method 3, the network device implicitly notifies the terminal device whether a DMRS can be transmitted on some of the first resources. To be specific, when the configuration information sent by the network device to the terminal device is particular configuration information (that is, the configuration information is information belonging to the first configuration set), the terminal device can determine that the second resource in the first resources may be used to transmit the first information. Compared with Method 1 and Method 2, additional signaling overheads can be reduced in Method 3.

The following describes the foregoing methods in detail with reference to specific embodiments.

Embodiment 1

In this embodiment, the network device explicitly notifies whether resources, mapped to no DMRS, in all resources that may be mapped to a DMRS port can be used to transmit another signal, where the another signal may be at least one of a data signal, another reference signal, or a control signal. In this embodiment, a relatively simple indication method is used. If the network device notifies the terminal device that the resources, mapped to no DMRS, in all the resources that may be mapped to the DMRS port can be used to transmit another signal, all of the resources, mapped to no DMRS, in all the resources that may be mapped to the DMRS port may be used to transmit another signal. If the network device notifies that the resources, mapped to no DMRS, in all the resources that may be mapped to the DMRS port cannot be used to transmit another signal, all of the resources, mapped to no DMRS, in all the resources that may be mapped to the DMRS port may be muted (where the muting means that an RE resource is muted and is not used).

Uplink and downlink DMRSs on links of different transmission directions (for example, a first transmission direction is an uplink transmission direction and a second transmission direction is a downlink transmission direction, or a first transmission direction is a downlink transmission direction and a second transmission direction is an uplink transmission direction) need to be configured orthogonally to each other, and are usually for scenarios such as a dynamic TDD (or flexible duplex) scenario. In a non-dynamic TDD (or flexible duplex) scenario, usually, a serious cross interference problem does not need to be considered, and DMRS orthogonality on uplink and downlink links of different cells does not need to be configured either. If a dynamic TDD (or flexible duplex) service or the like is used in a cell or a scenario, the service is used within a period of time or is always used, instead of using the service within a very short period of time (for example, within one or more slots, mini-slots, or subframes).

Therefore, the network device may indicate whether a dynamic TDD (or flexible duplex) service or the like is used within a time period. The indication information may be of N (where N is 1 or greater than 1) bits, and may be carried in higher layer signaling, broadcast signaling, a media access control (English: Media Access Control, MAC for short) control element (English: Control Element, CE for short), or DCI. Signaling in all the embodiments in this patent may be the higher layer signaling, the broadcast signaling, the MAC CE, the DCI, or the like. A signaling indication method particularly mentioned in this embodiment is considered as a possible preferable indication method. Some signaling indication methods mentioned in various embodiments do not represent that only a corresponding signaling indication method can be used in an embodiment of this solution.

Broadcast information may be a main information block (main information block, MIB) or a system information block (system information block, SIB). The higher layer signaling may be radio resource control (radio resource control, RRC) signaling. The foregoing control channel information may be downlink control information, and the downlink control information may be control information carried on a physical downlink control channel (physical downlink control channel, PDCCH), common control channel information (for example, a physical control format indicator channel (physical control format indicator channel, PCFICH) in a long term evolution (long term evolution, LTE) system), or a channel that is newly introduced into a standard and that has a same function but a different name).

A dynamic TDD (or flexible duplex) service is usually maintained for a period of time, and usually the service is used for a relatively large amount of user equipment. For example, a user in a cell needs to be notified whether all users in the cell use a dynamic TDD (or flexible duplex) service or the like in a period of time. Therefore, the higher layer signaling or the broadcast signaling may be used to send the indication information, thereby reducing overheads. Certainly, another implicit indication method or another configuration may be used for triggering. For example, in some configurations, user equipment may determine, based on the configurations, that currently a dynamic TDD (or flexible duplex) service needs to be used or does not need to be used. In this case, one-bit explicit indication is no longer required, thereby reducing overheads. For example, the network device indicates, to the terminal device, a DMRS port offset, a location offset of a time domain symbol to which a DMRS is mapped, or an offset of a frequency domain location to which a DMRS is mapped. If the network device indicates that the terminal device uses the foregoing configuration, the terminal device may determine that uplink and downlink DMRS orthogonality needs to be configured. To reduce overheads, the terminal device may determine, based on the configuration, whether resources, mapped to no DMRS, in all resources that may be mapped to a DMRS port are used to transmit other information.

If it explicitly or implicitly indicates that no dynamic TDD (or flexible duplex) service is used within a time period, or there is no need to consider uplink and downlink DMRS orthogonality, within all time units (for example, slots, mini-slots, or subframes) of the time period, there is no need to consider an uplink and downlink DMRS orthogonality configuration for neighboring cells, and resources, mapped to no DMRS, in all resources that may be mapped to a DMRS port may be used to transmit other information or another signal (at least one of data information, another reference signal, or control information). That is, it may be considered that the DMRS and the other information or the another signal (where in the following, that resources, mapped to no DMRS, in all resources that may be mapped to a DMRS port may be used to transmit other information or another signal is considered as FDM multiplexing of the DMRS and the other information) can be multiplexed through FDM.

If it indicates that a dynamic TDD (or flexible duplex) service is used within a time period, there may be the following several cases:

(1) Within all time units of the time period, a DMRS and other information cannot be multiplexed through FDM.

(2) Within all anchor time units (including anchor slots, anchor mini-slots, or anchor subframes) (where the anchor time unit is a time unit within which transmission directions in cells are fixed and the same) of the time period, a DMRS and other information may be multiplexed through FDM, and the DMRS and other information cannot be multiplexed through FDM within another dynamic time unit.

Figure 9:
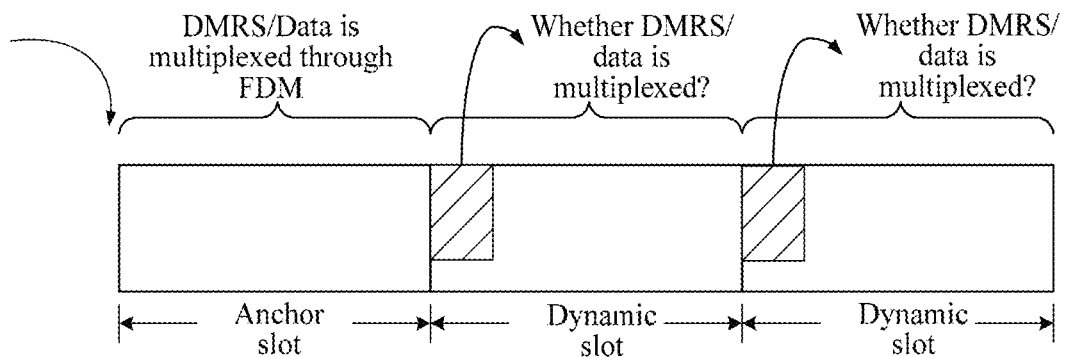
FIG. 9 is a schematic diagram of an anchor time unit according to this application.

FIG. 9 is a schematic diagram of an anchor time unit. Within the anchor time unit, a DMRS and other information may be multiplexed through FDM.

FIG. 9 is a schematic diagram of an anchor time unit. Within the anchor time unit, a DMRS and other information may be multiplexed through FDM.

(3) Within all anchor time units of the time period, a DMRS and other information may be multiplexed through FDM, and within another dynamic time unit, one bit is further used to indicate whether the DMRS and other information are multiplexed through FDM.

(4) Within all time units of the time period, one bit is further used to indicate whether a DMRS and other information are multiplexed through FDM.

The bit in (3) and (4) may be carried in DCI. If a semi-static frame configuration exists or there is a frame template between cells, the bit may be carried in semi-static signaling.

In this application, the network device may indicate (by using the first configuration information), to UE, whether a dynamic TDD (or flexible duplex) service is used in a time period, so that the UE learns whether the DMRS and other information can be multiplexed through FDM. Alternatively, one bit may be directly used for indication. If the bit is 0 (or 1), within all slots/mini-slots/subframes of the time period, the DMRS and other information may be multiplexed through FDM. If the bit is 1 (or 0), any one of the following methods (1) to (4) is used for processing. If the foregoing methods (3) and (4) are used for processing, the network device further needs to send the second configuration information.

In this embodiment, the first configuration information may be or may not be sent. For example, the first configuration information is sent. A different value indicated in the first configuration information is corresponding to a different configuration. If the network device may not send the first configuration information, it may be considered that a default configuration is used when the first configuration information is not sent. If the network device sends the first configuration information, the terminal device performs corresponding processing based on the indication information of the network device.

In this embodiment, that the network device notifies the terminal device whether to use a dynamic TDD (or flexible duplex) service is merely an explanation. In an actual protocol, related indication information may not be specified for indicating a service or other content. In the protocol, a possible operation is to specify a piece of indication information, where different corresponding processing is performed when the indication information corresponds to a different value. Therefore, a statement about whether a service is indicated in this embodiment does not affect innovation of a substantial solution in this embodiment.

In this embodiment of this application, a minimum quantity of indication overheads are used to indicate whether the DMRS is multiplexed with data or another RS.

Referring to the procedure shown in FIG. 8 and Embodiment 1, the first configuration information is used to indicate whether a dynamic TDD (or flexible duplex) service is used within a time period. When the first configuration information is first indication information, it indicates that the dynamic TDD (or flexible duplex) service is not used. Therefore, the terminal device determines that the second resource in the first resources may be used to transmit the first information, to be specific, the DMRS port and a channel may be multiplexed (where the channel includes data information, control information, or another reference signal different from the DMRS). When the first configuration information is second indication information, it indicates that the dynamic TDD (or the flexible duplex) service is used. Therefore, the terminal device determines that the third resource in the first resources is not used to transmit the first information.

Embodiment 1 includes two solutions respectively as follows:

Solution 1. The configuration information includes the first configuration information.

The first configuration information indicates whether a dynamic TDD (or flexible duplex) service is used. If the service is used, the first configuration information is the second indication information. In this case, the terminal device determines that the third resource in the first resources is not used to transmit the first information. If the service is not used, the first configuration is the first indication information. In this case, the terminal device determines that the second resource in the first resources may be used to transmit the first information.

Solution 2. The configuration information includes the first configuration information and the second configuration information.

First, the first configuration information is used to indicate that a dynamic TDD (or flexible duplex) service is used, and then the second configuration information is further used to indicate that the second resource in the first resources is used to transmit the first information or determine that the third resource in the first resources is not used to transmit the first information.

Embodiment 2

A relatively simple indication method is used in Embodiment 1. For example, when a dynamic TDD service is used, resources, mapped to no DMRS, in all resources that may be mapped to a DMRS port are all muted. Actually, if a relatively small quantity of uplink and downlink DMRS ports need to be configured orthogonally to each other, some resources, mapped to no DMRS, in all resources that may be mapped to a DMRS port may still be used to transmit other information/another signal. The resources that may be multiplexed may be used as far as possible in Embodiment 2, thereby saving resources.

It is assumed that four ports are multiplexed on one DMRS symbol, eight ports are multiplexed on two DMRS symbols, and when uplink and downlink DMRSs are configured orthogonally to each other, a quantity of uplink and downlink DMRS ports needs to be small (where usually, in a case of strong cross interference, the uplink and downlink DMRSs need to be configured orthogonally to each other, and in this case, if there is a large amount of uplink and downlink data/large quantity of DMRS layers, it is quite possible that demodulation cannot be correctly performed due to the strong interference. Therefore, it is speculated that when the uplink and downlink DMRSs are configured orthogonally to each other, there is a small quantity of uplink and downlink DMRS ports). In addition, symbols on which the uplink and downlink DMRSs are located can be aligned. In this case, it is considered that a resource corresponding to a port that is not mapped to a DMRS on the second DMRS symbol can certainly transmit other information/another signal, while whether a resource corresponding to a port that is not mapped to a DMRS on the first DMRS symbol can be multiplexed with other information/another signal needs to be indicated. An indication method is the same as that in Embodiment 1.

In this case, the network device only needs to indicate on some DMRS symbols (where the DMRS symbol herein refers to a symbol resource that may be mapped to a DMRS port), whether resources, mapped to no DMRS, in all resources that may be mapped to the DMRS port can be multiplexed with other information/another signal through FDM. On remaining DMRS symbols, if on the symbols, there is a resource mapped to no DMRS, other information/another signal can be transmitted.

Figure 10:
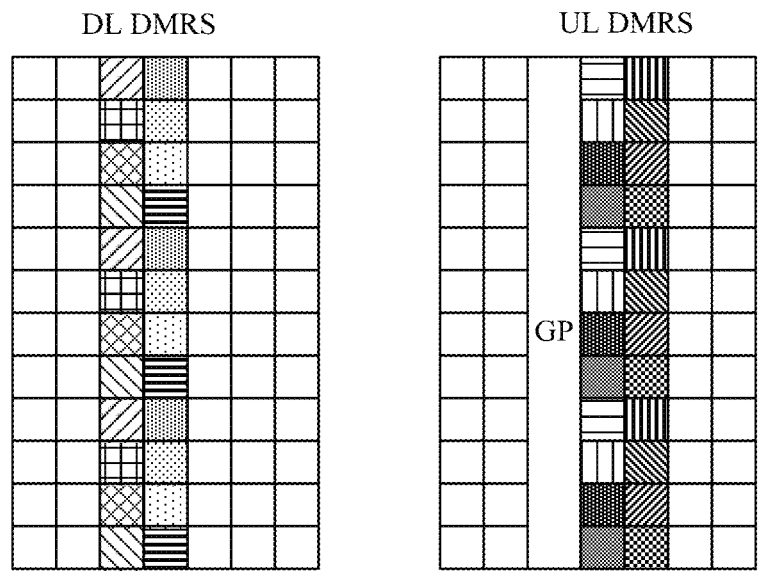
FIG. 10 is a schematic diagram of resource mapping for uplink and downlink DMRSs according to this application.

If uplink and downlink DMRS symbols cannot be aligned with each other (as shown in FIG. 10) because a quantity of control channel symbols in a slot structure is changeable or due to a guard period (English: guard period, GP for short) of a self-contained slot (where within one slot, there is a downlink part and an uplink part), or if uplink and downlink DMRSs may be configured orthogonally to each other by using a TDM method, both of the two DMRS symbols in the foregoing cases need to indicate that on the symbols, resources, mapped to no DMRS, in all resources that may be mapped to the DMRS port can transmit other information/another signal. An indication method is similar to that in Embodiment 1, while a difference only lies in that based on steps (3) and (4) in Embodiment 1, two bits need to be used to indicate whether each bit, corresponding to a DMRS not used on a DMRS symbol, can transmit other information/another signal.

Figure 11:
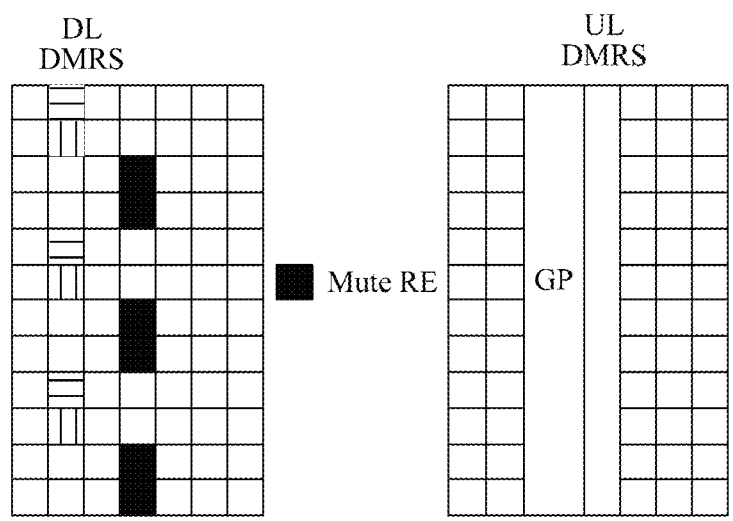
FIG. 11 is a schematic diagram of resource mapping for uplink and downlink DMRSs according to this application.

If uplink and downlink DMRS symbols cannot be aligned, to enable uplink and downlink DMRSs to be configured orthogonally to each other, some resources on a data symbol possibly need to be muted. First, the data symbol that needs to be muted is indicated. A quantity N of data symbols that are on an uplink and a downlink and that are possibly muted may be deduced based on a quantity of control symbols within uplink and downlink slots and a GP length of an uplink self-contained slot. In this case, $\log_2^N$ bits may be used to indicate the quantity of data symbols that need to be muted. Assuming that uplink and downlink DMRSs are orthogonal through FDM, it may be determined that on a subcarrier that is on a link and that is used to transmit a DMRS, no DMRS on a peer link is definitely transmitted. Therefore, on a subcarrier that is used to transmit a DMRS on a link and that corresponds to a data symbol needing to be muted on the link, other information definitely can be transmitted. The terminal device may not know a configuration of a DMRS port on a link of a neighboring cell. A design is simple, and REs other than the subcarrier on the data symbol needing to be muted on the link may be all muted. In this way, uplink and downlink DMRS orthogonality can be definitely ensured. For example, a downlink DMRS corresponds to two ports that are multiplexed through FDM, user equipment on a downlink does not know a specific port configuration of a DMRS on an uplink. However, it is known through an indication of a muted data symbol that the symbol needing to be muted is the fourth symbol. In this case, REs that need to be muted on the data symbol are shown in FIG. 11.

In addition to the foregoing method, whether resources corresponding to some or all of unused DMRS ports are used to transmit other information/another signal may be further indicated.

Based on a method for configuring uplink and downlink DMRS orthogonality specified in a protocol and a port configuration of a DMRS on a link, it may be deduced that resources corresponding to which of DMRS ports that are not used on the link may be used to transmit other information/another signal. Then, corresponding DCI bit information is used to indicate whether the resources corresponding to the ports are used to transmit other information/another signal.

Figure 12:
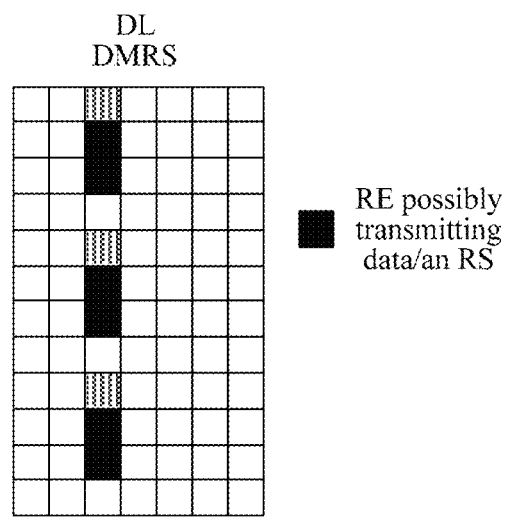
FIG. 12 is a schematic diagram of resource mapping for an uplink DMRS or a downlink DMRS according to this application.

For example, (as shown in FIG. 12), a link in a current cell is a downlink link, and a DMRS port configuration is that on one layer (one port), uplink and downlink DMRSs are configured orthogonally to each other by using an FDM method. User equipment in the current cell does not know an uplink DMRS port configuration of a peer cell, but can determine that there is at least one port on an uplink of the peer cell. In this case, downlink user equipment in the current cell may determine that RE resources corresponding to a maximum of two ports may be used to transmit other information/another signal. Then, two bits may be respectively used to indicate whether the resources corresponding to the two ports are used to transmit other information/another signal.

Figure 13:
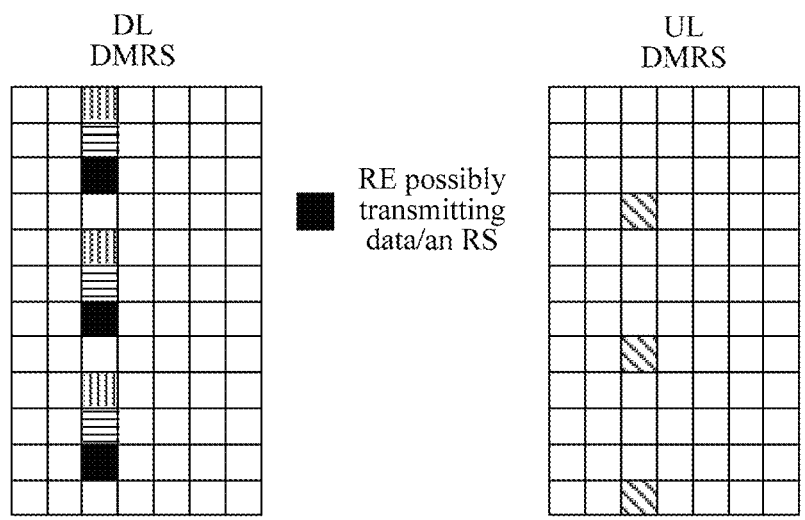
FIG. 13 is a schematic diagram of resource mapping for an uplink DMRS or a downlink DMRS according to this application.

If two layers are configured for a downlink DMRS in the current cell (as shown in FIG. 13), the downlink user equipment of the current cell may determine that an RE resource corresponding to a maximum of one port may be used to transmit other information/another signal. In this case, only one bit may be used for indication.

A change of a length of a quantity of indication bits in DCI is not beneficial for a user to blindly detect and control a channel. Therefore, DCI indication bits having a fixed length may be used to indicate that RE resources corresponding to which DMRS ports may be used to transmit data or another RS. A quantity of the indication bits having the fixed length may be a maximum indication bit length that is needed in all possible scenarios. Alternatively, to reduce indication overheads, only some resources corresponding to a port that is most possibly multiplexed with other information/another signal are indicated. For example, whether resources corresponding to one DMRS port may be multiplexed through FDM with other information are indicated only.

The foregoing method for indicating that resources corresponding to some DMRS ports may be or may not be multiplexed with data or another RS may be further applied to a case in which an RE on a data symbol is muted. In this case, first, a data symbol needing to be muted is indicated. An indication method is the same as the method for indicating a data symbol needing to be muted that is previously mentioned in this embodiment. In addition, DMRS ports corresponding to which subcarrier resources needing to be muted on the data symbol further need to be indicated. An indication method is the same as the method for indicating whether resources corresponding to some ports are multiplexed, provided that in this case, RE resources needing to muted or used to transmit other information/another signal are on the data symbol rather than the DMRS symbol.

In addition to indicating that a resource corresponding to a DMRS port may be used to transmit other information or may be muted, a resource number corresponding to a resource that may be used to transmit other information or may be muted may be further indicated. If an FDM multiplexing method or a TDM multiplexing method is used for all ports of a DMRS, each DMRS port may correspond to one resource number. If a CDM multiplexing method is used for some or all ports of a DMRS, one resource number may correspond to resources of a plurality of ports.

In this embodiment of this application, one (a comb structure with a subcarrier interval of 4) of DMRS pattern designs is only used as an example. The method in this embodiment is also applicable to another DMRS design (for example, various DMRS pattern designs mentioned in Background).

In this embodiment of this application, a tradeoff is made between indication overheads and resource utilization, expecting to multiplex, by using a minimum of indication overheads, more resources, mapped to no DMRS, in all resources that may be mapped to a DMRS port.

Embodiment 3

In Embodiment 1 and Embodiment 2, an explicit indication method is mainly used to notify the user equipment whether the DMRS is multiplexed with other information/another signal through FDM. In Embodiment 3, some implicit methods may be used to indicate whether a DMRS is multiplexed with other information/another signal through FDM, thereby reducing overheads.

In some scenarios, it may be determined that uplink and downlink DMRSs are definitely configured orthogonally to each other or are definitely not configured orthogonally to each other. In the scenarios, whether a DMRS may be multiplexed with other information through FDM does not need to be explicitly indicated.

For some DMRS configuration sets, it may be determined that a DMRS is definitely multiplexed with other information/another signal through FDM. For example, the network device configures an additional DMRS for the user equipment, where the additional DMRS is usually configured at a high-speed scenario or a high Doppler shift scenario. This case may not be a dynamic TDD scenario, and uplink and downlink DMRS orthogonality does not need to be configured. Therefore, if the network device configures an additional DMRS for the user equipment, it may be determined that the DMRS is definitely multiplexed with other information/another signal through FDM.

For some port or layer configuration sets, it may be determined that uplink and downlink DMRSs are definitely configured orthogonally to each other or do not need to be configured orthogonally to each other. In this case, whether a DMRS is multiplexed with other information/another signal through FDM may be learned through the configuration. For example, when a relatively large quantity of layers configured for a DMRS (for example, the quantity of layers is greater than a threshold), the user equipment may determine that the DMRS is definitely multiplexed with other information/another signal through FDM. Thresholds for quantities of uplink and downlink layers may be the same or different. Because uplink and downlink DMRS orthogonality is configured when there is strong cross interference, in the scenario, if there are an excessively large quantity of uplink and downlink DMRS layers, demodulation possibly cannot be performed correctly. Therefore, when a quantity of DMRS layers is configured relatively large, the user equipment deduces that this may not be a dynamic TDD scenario.

In addition, if some port or layer configurations are used only when uplink and downlink DMRSs are configured orthogonally to each other, when the network device indicates the configuration, the user equipment may determine, based on the configuration, that a DMRS is not multiplexed with other information/another signal. For example, when there are a relatively small quantity of ports but the network device configures that the ports are mapped to the second DMRS symbol, this configuration may be a configuration existing only when uplink and downlink DMRSs need to be orthogonal.

In addition, if a CDM method or an OCC having a larger length is used only when uplink and downlink DMRSs are orthogonal, when the network device indicates the configuration, the user equipment may determine, based on the configuration, that a DMRS is not multiplexed with other information/another signal.

In Embodiment 3, some implicit methods are used to indicate whether a DMRS is multiplexed with other information/another signal through FDM, thereby reducing overheads.

In this embodiment, the network device implicitly notifies the terminal device whether to multiplex a DMRS (if the DMRS is multiplexed, the second resource in the first resources is used to transmit the first information; or if the DMRS is not multiplexed, the third resource in the first resources is not used to transmit the first information). That is, the network device sends the first configuration information to the terminal. If a configuration indicated by the first configuration information belongs to a configuration set, for example, the configuration set includes a configuration of an additional DMRS, the terminal learns that currently the additional DMRS is configured, and therefore, directly determines that the DMRS cannot be multiplexed, that is, the third resource in the first resources is not used to transmit the first information.

Embodiment 4

Figure 14:
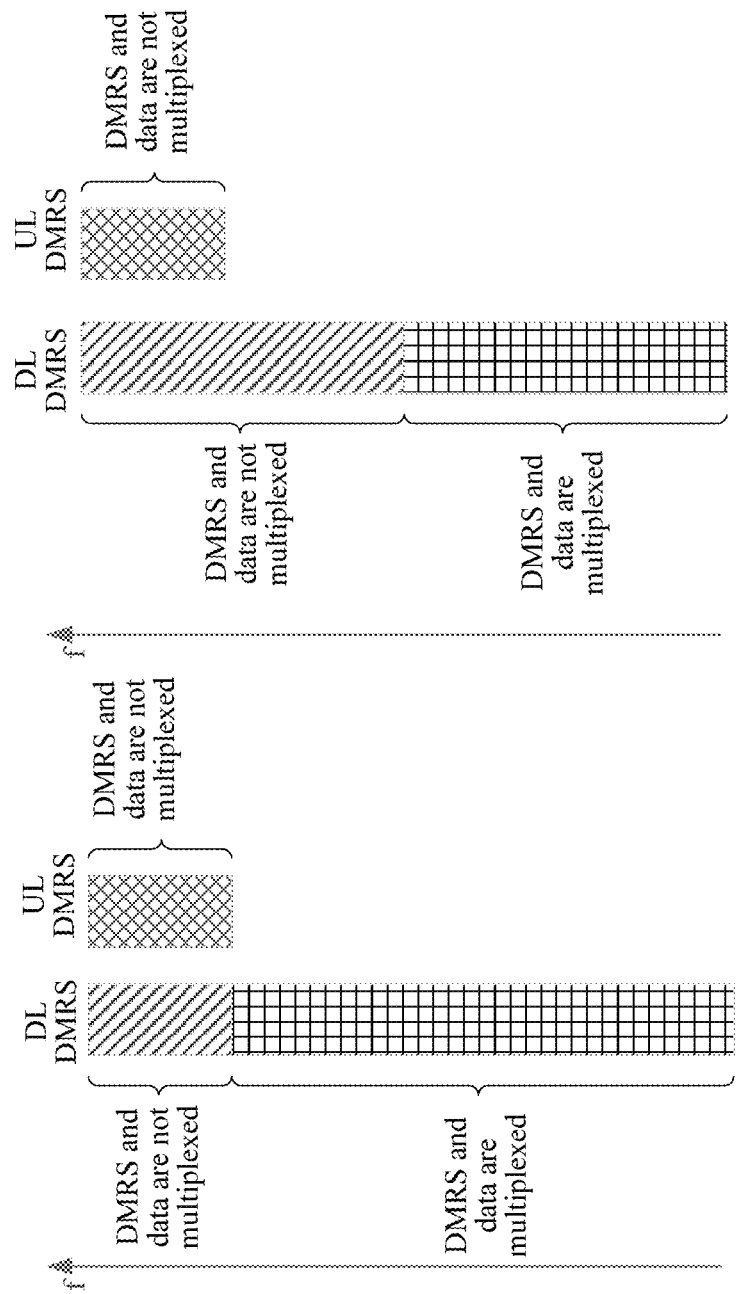
FIG. 14 is a schematic diagram of uplink and downlink bandwidth occupation according to this application.

In some scenarios, as shown in FIG. 14, when only partial bandwidths overlap on an uplink and a downlink, only uplink and downlink DMRSs that overlap in frequency domain need to be configured orthogonally to each other. If an entire bandwidth is completely muted because REs on some bandwidths need to be muted, resources are wasted.

Therefore, in this embodiment, bandwidths allocated on an uplink and/or a downlink are segmented, to indicate that on each segment of bandwidth, a DMRS can be multiplexed with data or another RS. For example, a bitmap manner may be used for indication. To be specific, each bit in the bitmap corresponds to whether a DMRS on a segment of bandwidth is multiplexed with data or another RS. A length of each segment of bandwidth may be the same, and may be a specific length, for example, a length of N RBs. A value of N may be configured, for example, may be 2, 4, 8, . . . , and the value of N is indicated by the network device. Alternatively, the value of N is related to a sub-band, a frequency band, a bandwidth allocated to a link, or a numerology (a subcarrier spacing). In addition, the value of N may be related to an allocated bandwidth, for example, is ½, ⅓, ¼, and the like of the allocated bandwidth, and specifically, is a multiple of the allocated bandwidth. The value may also be related to the foregoing factors. For example, each sub-band, frequency band, or a numerology corresponds to a unique value of N. The terminal device may determine, based on an allocated bandwidth, a sub-band, a frequency band, or a numerology to which the bandwidth belongs, thereby determining the length N of the segment. In addition, each sub-band, frequency band, or a numerology may correspond to a plurality of optional values. The terminal device determines, based on the allocated bandwidth, a sub-band, a frequency band, or a numerology to which the bandwidth belongs, determines a set of optional values of N, and then determines the value of N with reference to the indication information of the network device. The value of N may also be related to a length of a bandwidth allocated to the terminal device. For example, the length of the bandwidth belongs to different ranges, and corresponds to different values of N.

In solution of indication through segmentation, each segment of bandwidth may alternatively be different. A length of each segment of bandwidth has one or more optional values. To reduce signaling overheads, the configuration may be sent through higher layer signaling or a broadcast channel.

In this embodiment, indication through segmentation is performed for the case in which only partial bandwidths on the uplink and the downlink overlap, thereby fully using a DMRS resource that may be multiplexed.

Figure 15:
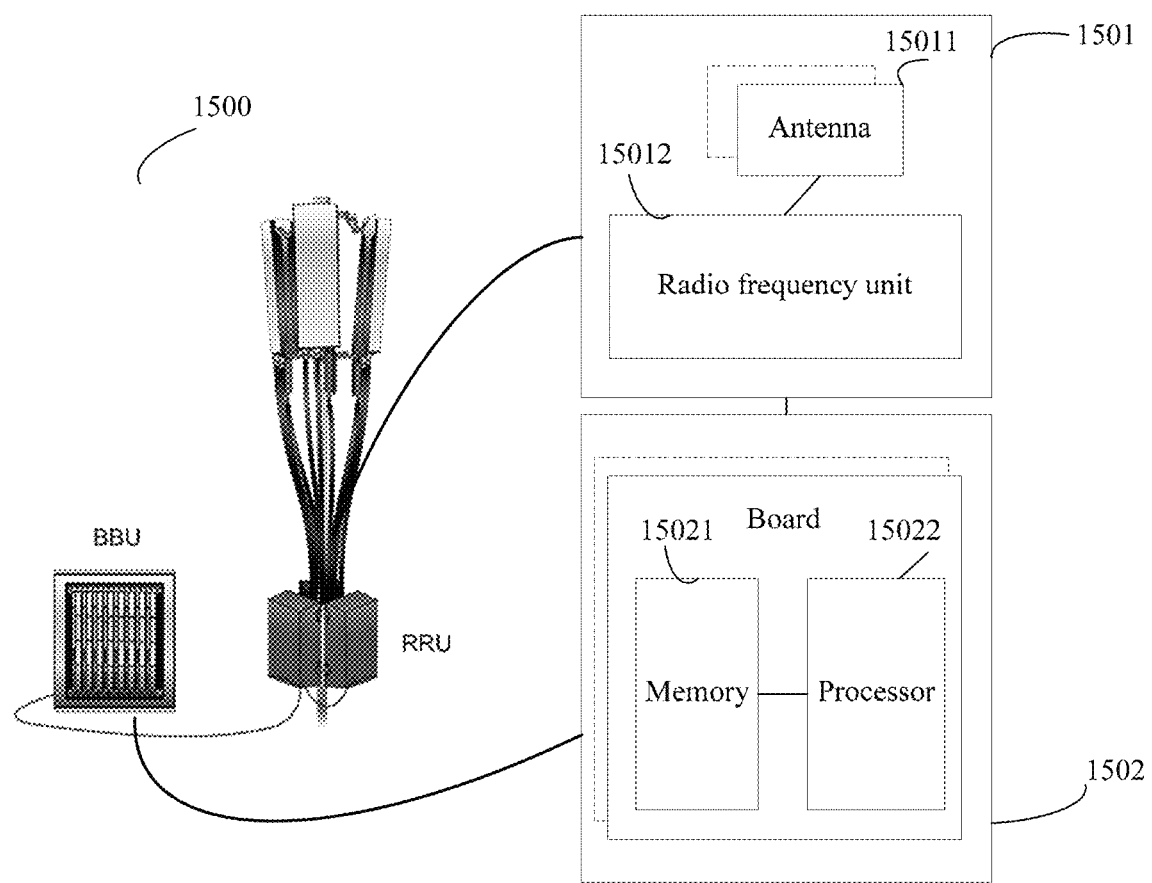
FIG. 15 is a schematic structural diagram of a network device according to this application.

Based on a same inventive concept, an embodiment of this application further provides a network device 1500. FIG. 15 is a schematic structural diagram of the network device 1500. The network device 1500 may be applied to the method performed by the network device in any one of the foregoing embodiments. The network device 1500 includes one or more remote radio units (English: remote radio unit, RRU for short) 1501 and one or more baseband units (English: baseband unit, BBU for short) 1502. The RRU 1501 may be referred to as a transceiver unit, a transceiver machine, a transceiver circuit, a transceiver, or the like, and may include at least one antenna 15011 and a radio frequency unit 15012. The RRU 1501 is mainly configured to send/receive a radio frequency signal and perform conversion between a radio frequency signal and a baseband signal, for example, configured to send the signaling indication in the foregoing embodiments to user equipment (that is, a terminal). The BBU 1502 is mainly configured to perform baseband processing, control the network device, and the like. The RRU 1501 and the BBU 1502 may be physically disposed together, or may be physically separated, namely, a distributed network device.

The BBU 1502 is a control center of the network device, may also be referred to as a processing unit, and is mainly configured to complete a baseband processing function, such as channel encoding, multiplexing, modulation, and spreading. For example, the BBU (the processing unit) may be configured to control the network device to perform the method performed by the network device in any one of the foregoing embodiments.

In an embodiment, the BBU 1502 may include one or more boards, where a plurality of boards may commonly support a radio access network (for example, an LTE network) of a single access standard, or may support a radio access network of different standards. The BBU 1502 further includes a memory 15021 and a processor 15022. The memory 15021 is configured to store necessary instructions and data. For example, the memory 15021 stores a parameter set (including a first parameter set and a second parameter set) in the foregoing embodiments, and generates an RS sequence. The processor 15022 is configured to control the network device to perform necessary actions, for example, configured to control the network device to perform the method performed by the network device in any one of the foregoing embodiments. The memory 15021 and the processor 15022 may serve one or more boards. That is, each board may be separately disposed with a memory and a processor. Alternatively, a same memory and processor may be shared by a plurality of boards. In addition, each board may be disposed with a necessary circuit.

Figure 16:
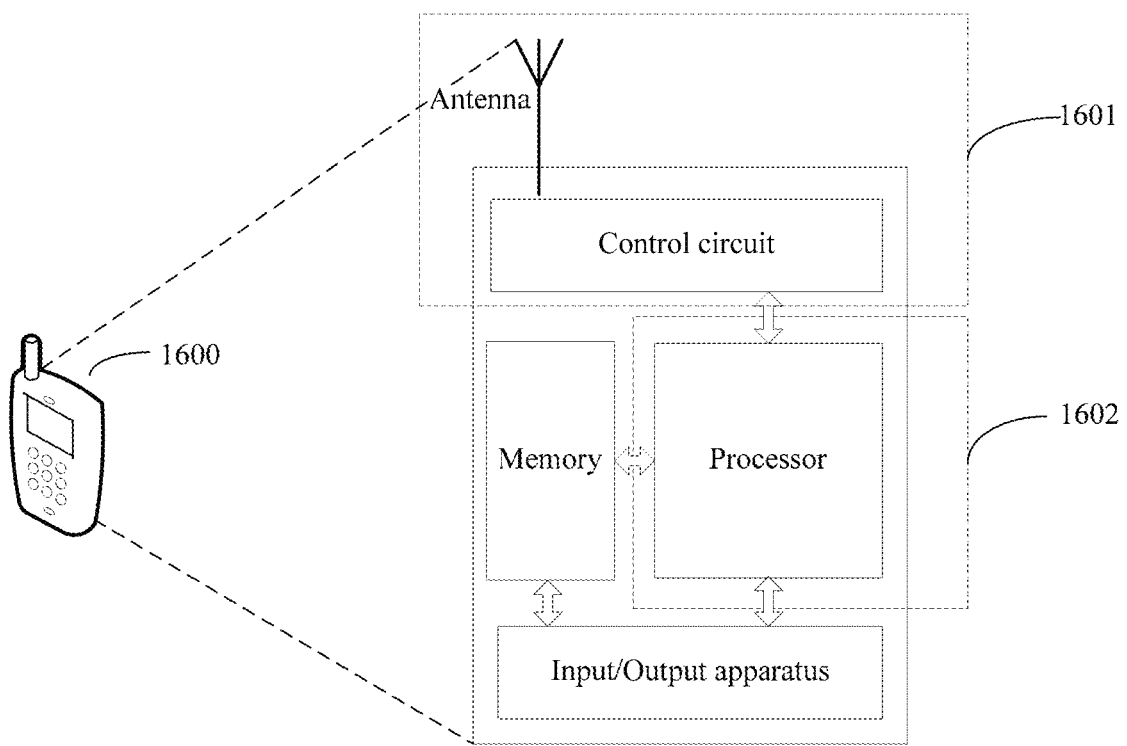
FIG. 16 is a schematic structural diagram of a terminal device according to this application.

Based on a same inventive concept, an embodiment of this application further provides a terminal device 1600. FIG. 16 is a schematic structural diagram of the terminal device. For ease of description, FIG. 16 shows only main components of the terminal device. As shown in FIG. 16, the terminal device 1600 includes a processor, a memory, a control circuit, an antenna, and an input/output apparatus. The processor is mainly configured to: process a communications protocol and communication data, control the entire terminal device, execute a software program, and process data of the software program, for example, configured to support the terminal device in executing the method executed by terminal device in any one of the foregoing embodiments. The memory is mainly configured to store a software program and data, for example, store a codebook described in the foregoing embodiment. The control circuit is mainly used for converting a baseband signal and a radio frequency signal and processing a radio frequency signal. The control circuit, together with the antenna, may also be referred to as a transceiver that is mainly configured to transmit and receive radio frequency signals in an electromagnetic wave form. The input/output apparatus, such as a touchscreen, a display, or a keyboard, is mainly configured to: receive data entered by a user and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 16 shows only one memory and one processor. Actually, the terminal device may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may be expressed as a central processing circuit or a central processing chip. A function of processing a communication protocol and communication data may be built into the processor, or may be stored in a storage unit in a form of a software program, so that the processor executes the software program to implement a baseband processing function.

Figure 18:
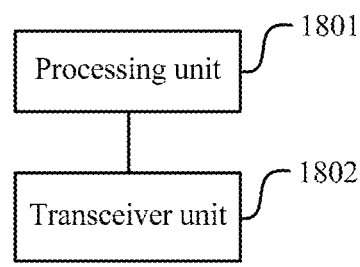
FIG. 18 is a schematic structural diagram of a terminal device according to this application.

For example, in this embodiment of the present invention, the antenna and the control circuit that have receiving and sending functions may be considered as a transceiver unit 1601 of the terminal device 1600, and the processor having a processing function may be considered as a processing unit 1602 of the terminal device 1600. As shown in FIG. 18, the terminal device 1600 includes a transceiver unit 1601 and a processing unit 1602. The transceiver unit may also be referred to as a transceiver, a transceiver machine, a transceiver apparatus, or the like. Optionally, a component that is in the transceiver unit 1601 and is configured to implement a receiving function may be considered as a receiving unit, and a component that is in the transceiver unit 1601 and is configured to implement a sending function may be considered as a sending unit, namely, the transceiver unit 1601 includes the receiving unit and the sending unit. For example, the receiving unit may also be referred to as a receiver, a receiver, a receiver circuit, or the like, and the sending unit may be referred to as a transmit machine, a transmitter, a transmit circuit, or the like.

Figure 17:
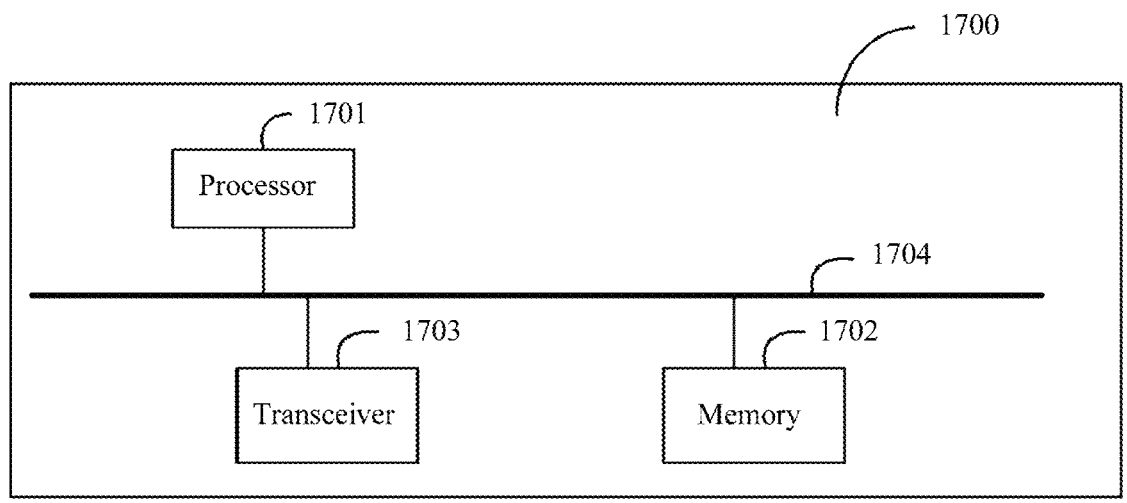
FIG. 17 is a schematic structural diagram of an apparatus according to this application.

Based on a same inventive concept, an embodiment of this application further provides an apparatus 1700. The apparatus may be a network device, or a terminal device. As shown in FIG. 17, the apparatus includes at least a processor 1701 and a memory 1702, and may further include a transceiver 1703 and a bus 1704.

The processor 1701, the memory 1702, and the transceiver 1703 are connected by using the bus 1704.

The memory 1702 is configured to store a computer executable instruction.

The processor 1701 is configured to execute the computer executable instruction stored in the memory 1702.

When the apparatus 1700 is a network device, the processor 1701 executes the computer executable instruction stored in the memory 1702, so that the apparatus 1700 performs a step performed by the network device provided in any embodiment of this application or the network device deploys a functional unit corresponding to the step.

When the apparatus 1700 is a terminal device, the processor 1701 executes the computer executable instruction stored in the memory 1702, so that the apparatus 1700 performs a step performed by the terminal device provided in any embodiment of this application or the terminal device deploys a functional unit corresponding to the step.

The processor 1701 may include different types of processors 1701, or include one type of processor 1701. The processor 1701 may be any one of the following components with a calculation and processing capability: a central processing unit (Central Processing Unit, CPU for short), an ARM processor, a field programmable gate array (Field Programmable Gate Array, FPGA for short), a dedicated processor, or the like. In an optional implementation, the processor 1701 may be further integrated into a many-core processor.

The memory 1702 may be any one or any combination of the following storage media: a random access memory (Random Access Memory, RAM for short), a read-only memory (read-only memory, ROM for short), a nonvolatile memory (nonvolatile memory, NVM for short), a solid state drive (Solid State Drive, SSD for short), a mechanical hard disk, a magnetic disk, a disk array, and the like.

The transceiver 1703 is used by the apparatus 1700 to perform data exchange with another device. For example, if the apparatus 1700 is a network device, the network device may perform a method performed by the network device according to any one of the foregoing embodiments. The network device performs data exchange with the terminal device by using the transceiver 1703. If the apparatus 1700 is a terminal device, the terminal may perform a method performed by the terminal device according to any one of the foregoing embodiments. The terminal device performs data exchange with the network device by using the transceiver 1703. The transceiver 1703 may be any one or a combination of the following: a network interface (for example, an Ethernet interface), a wireless network interface card, or another device having a network access function.

The bus 1704 may include an address bus, a data bus, a control bus, and the like. For ease of representation, the bus is represented by using a thick line in FIG. 17. The bus 1704 may be any one or any combination of the following components for wired data transmission: an industry standard architecture (Industry Standard Architecture, ISA for short) bus, a peripheral component interconnect (Peripheral Component Interconnect, PCI for short) bus, an extended industry standard architecture (Extended Industry Standard Architecture, EISA for short) bus, and the like.

An embodiment of this application provides a computer-readable storage medium. The computer-readable storage medium stores a computer executable instruction. A processor of a network device or a terminal device executes the computer executable instruction, so that the network device or the terminal device performs a step performed by the network device or the terminal device in the foregoing method provided in the embodiments of this application or the network device or the terminal device deploys a functional unit corresponding to the step.

An embodiment of this application provides a computer program product. The computer program product includes a computer executable instruction, and the computer executable instruction is stored in a computer-readable storage medium. A processor of a network device or a terminal device may read the computer executable instruction from the computer-readable storage medium. The processor executes the computer executable instruction, so that the network device or the terminal device performs a step performed by the network device or the terminal device in the foregoing method provided in the embodiments of this application or the network device or the terminal device deploys a functional unit corresponding to the step.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a DVD), a semiconductor medium (for example, a Solid State Disk (SSD)), or the like.

Based on a same inventive concept, this application further provides a terminal device, as shown in FIG. 18. The terminal device includes a transceiver unit 1802 and a processing unit 1801, and may be configured to perform a method performed by the terminal device in any one of the foregoing embodiments.

A transceiver unit 1802 is configured to receive configuration information sent by a network device.

The processing unit 1801 is configured to determine, based on the configuration information, that a second resource in first resources is used to transmit first information or that a third resource in first resources is not used to transmit first information, where the first resources are resources mapped to a DMRS port.

Optionally, the configuration information includes first configuration information, the first configuration information is first indication information or second indication information, the first indication information indicates that the second resource in the first resources is used to transmit the first information, and the second indication information indicates that the third resource in the first resources is not used to transmit the first information.

Optionally, the configuration information includes first configuration information and second configuration information, the first configuration information is first indication information or second indication information, the first indication information indicates that the second resource in the first resources is used to transmit the first information, the second indication information instructs the terminal device to receive the second configuration information, and the second configuration information is used to indicate that the second resource in the first resources is used to transmit the first information, or determine that the third resource in the first resources is not used to transmit the first information.

Optionally, the configuration information includes first configuration information, and when a configuration indicated by the first configuration information belongs to a first configuration set, the first configuration information indicates that the second resource in the first resources is used to transmit the first information.

Optionally, the first configuration set includes some or all of the following configurations:

a configuration in which a quantity of spatial layers of DMRSs is greater than N, where N is a positive integer; and a configuration of an additional DMRS.

Optionally, the second resource is some or all of the first resources except a fourth resource, the third resource is some or all of the first resources except the fourth resource, and the fourth resource is a resource corresponding to a DMRS port indicated by a DMRS port configuration received by the terminal device.

Optionally, the first resources are mapped to at least two time domain symbols, the first resources include a resource mapped to a first symbol in the at least two time domain symbols and a resource mapped to a second symbol in the at least two time domain symbols, resources that are in the first resources except the fourth resource and that are mapped to the first symbol are fifth resources, resources that are in the first resources except the fourth resource and that are mapped to the second symbol are sixth resources, and the second resource is some or all of the fifth resources or the second resource is some or all of the sixth resources.

Optionally, the first information is at least one of the following information: data information, control information, and another reference signal different from a DMRS.

Figure 19:
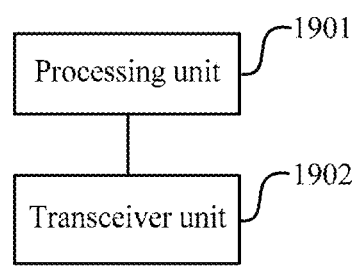
FIG. 19 is a schematic structural diagram of a network device according to this application.

Based on a same inventive concept, this application further provides a network device, as shown in FIG. 19. The network device includes a transceiver unit 1902 and a processing unit 1901, and may be configured to perform a method performed by the network device in any one of the foregoing embodiments.

The processing unit 1901 is configured to send, by using the transceiver unit 1902, configuration information to a terminal, where the configuration information is used by the terminal device to determine, based on the configuration information, that a second resource in first resources is used to transmit first information or that a third resource in first resources is not used to transmit first information, and the first resources are resources mapped to a DMRS port.

Optionally, the configuration information includes first configuration information, the first configuration information is first indication information or second indication information, the first indication information indicates that the second resource in the first resources is used to transmit the first information, and the second indication information indicates that the third resource in the first resources is not used to transmit the first information.

Optionally, the configuration information includes first configuration information and second configuration information, the first configuration information is first indication information or second indication information, the first indication information indicates that the second resource in the first resources is used to transmit the first information, the second indication information instructs the terminal device to receive the second configuration information, and the second configuration information is used to indicate that the second resource in the first resources is used to transmit the first information, or determine that the third resource in the first resources is not used to transmit the first information.

Optionally, the configuration information includes first configuration information, and when a configuration indicated by the first configuration information belongs to a first configuration set, the first configuration information indicates that the second resource in the first resources is used to transmit the first information.

Optionally, the first configuration set includes some or all of the following configurations:

a configuration in which a quantity of spatial layers of DMRSs is greater than N, where N is a positive integer; and a configuration of an additional DMRS.

Optionally, the second resource is some or all of the first resources except a fourth resource, the third resource is some or all of the first resources except the fourth resource, and the fourth resource is a resource corresponding to a DMRS port indicated by a DMRS port configuration received by the terminal device.

Optionally, the first resources are mapped to at least two time domain symbols, the first resources include a resource mapped to a first symbol in the at least two time domain symbols and a resource mapped to a second symbol in the at least two time domain symbols, resources that are in the first resources except the fourth resource and that are mapped to the first symbol are fifth resources, resources that are in the first resources except the fourth resource and that are mapped to the second symbol are sixth resources, and the second resource is some or all of the fifth resources or the second resource is some or all of the sixth resources.

Optionally, the first information is at least one of the following information: data information, control information, and another reference signal different from a DMRS.

A person skilled in the art can further understood that, the various illustrative logical blocks (illustrative logical block) and the steps (step) listed in the embodiments of the present invention may be implemented through electronic hardware, computer software, or a combination of the two. Whether the functions are implemented by using hardware or software depends on particular applications and a design requirement of an entire system. A person of ordinary skill in the art may use various methods to implement the described functions for each particular application, but it should not be considered that the implementation goes beyond the scope of the embodiments of the present invention.

The various illustrative logical units and circuits described in the embodiments of the present invention may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors together with a digital signal processor core, or any other similar configuration.

Steps of the methods or algorithms described in the embodiments of the present invention may be directly embedded into hardware, a software unit executed by the processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor, so that the processor may read information from the storage medium and write information to the storage medium.

Optionally, the storage medium may be integrated into the processor. The processor and the storage medium may be arranged in an ASIC, and the ASIC may be arranged in a terminal device. Optionally, the processor and the storage medium may be arranged in different components of the terminal device.

In one or more example designs, the functions described in the embodiments of the present invention may be implemented by using hardware, software, firmware, or any combination thereof. If the functions are implemented by using software, the functions may be stored in a computer-readable medium or are transmitted to the computer-readable medium in a form of one or more instructions or code. The computer-readable medium includes a computer storage medium and a communications medium that enables a computer program to move from one place to another place. The storage medium may be an available medium that can be accessed by any general-purpose or special computer. For example, such a computer-readable medium may include but is not limited to a RAM, a ROM, an EEPROM, a CD-ROM or another optical disc storage, a disk storage or another magnetic storage apparatus, or any other medium that may be used to carry or store program code, where the program code is in a form of an instruction or a data structure or in a form that can be read by a general-purpose or special computer or by a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc (disk) and the disk (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

The foregoing descriptions of this specification in the present invention may enable a person skilled in the art to use or implement the content of the present invention. It should be considered that any modification made based on the disclosed content is obvious in the art. The basic principles described in the present invention may be applied to other variations without departing from the essence and scope of the present invention. Therefore, the content disclosed in the present invention is not limited to the described embodiments and designs, but may be further extended to a maximum scope that is consistent with the principles of the present invention and new features disclosed in the present invention.

What is claimed is:

1. A resource indication method, comprising:
   receiving, by a terminal device, configuration information sent by a network device; and
   determining, by the terminal device based on the configuration information, that a second resource in first resources is used to transmit first information or that a third resource in first resources is not used to transmit first information, wherein the first resources are resources mapped to a demodulation reference signal (DMRS) port,
   wherein the first information includes at least one of the following information: data information, control information, and another reference signal different from a DMRS, and
   wherein the second resource includes some or all of the first resources except a fourth resource, the third resource includes some or all of the first resources except the fourth resource, and the fourth resource includes a resource corresponding to a DMRS port indicated by a DMRS port configuration received by the terminal device.

2. The method according to claim 1, wherein the configuration information comprises first configuration information, the first configuration information is first indication information or second indication information, the first indication information indicates that the second resource in the first resources is used to transmit the first information, and the second indication information indicates that the third resource in the first resources is not used to transmit the first information.

3. The method according to claim 1, wherein the configuration information comprises first configuration information and second configuration information, the first configuration information is first indication information or second indication information, in response to the first configuration information being the first indication information, the first indication information indicates that the second resource in the first resources is used to transmit the first information, in response to the first configuration information being the second indication information, the second indication information instructs the terminal device to receive the second configuration information, and the second configuration information is used to indicate that the second resource in the first resources is used to transmit the first information, or determine that the third resource in the first resources is not used to transmit the first information.

4. The method according to claim 1, wherein the configuration information comprises first configuration information, and when a configuration indicated by the first configuration information belongs to a first configuration set, the first configuration information indicates that the second resource in the first resources is used to transmit the first information.

5. The method according to claim 4, wherein the first configuration set comprises some or all of the following configurations:
   a configuration in which a quantity of spatial layers of DMRSs is greater than N, wherein N is a positive integer; and
   a configuration of an additional DMRS.

6. The method according to claim 1, wherein
   the first resources are mapped to at least two time domain symbols, the first resources comprise one or more resources, except the fourth resource, mapped to a first symbol in the at least two time domain symbols and one or more resources, except the fourth resource, mapped to a second symbol in the at least two time domain symbols, wherein the one or more resources that are mapped to the first symbol are fifth resources, the one or more resources that are mapped to the second symbol are sixth resources, and the second resource is some or all of the fifth resources or the second resource is some or all of the sixth resources.

7. A resource indication method, comprising:
   sending, by a network device, configuration information to a terminal, wherein the configuration information is used by a terminal device to determine, based on the configuration information, that a second resource in first resources is used to transmit first information or that a third resource in first resources is not used to transmit first information, and the first resources are resources mapped to a demodulation reference signal (DMRS) port, wherein the first information includes at least one of the following information: data information, control information, and another reference signal different from a DMRS, and wherein the second resource includes some or all of the first resources except a fourth resource, the third resource includes some or all of the first resources except the fourth resource, and the fourth resource includes a resource corresponding to a DMRS port indicated by a DMRS port configuration received by the terminal device.

8. The method according to claim 7, wherein the configuration information comprises first configuration information, the first configuration information is first indication information or second indication information, the first indication information indicates that the second resource in the first resources is used to transmit the first information, and the second indication information indicates that the third resource in the first resources is not used to transmit the first information.

9. The method according to claim 7, wherein the configuration information comprises first configuration information and second configuration information, the first configuration information is first indication information or second indication information, in response to the first configuration information being the first indication information, the first indication information indicates that the second resource in the first resources is used to transmit the first information, in response to the first configuration information being the second indication information, the second indication information instructs the terminal device to receive the second configuration information, and the second configuration information is used to indicate that the second resource in the first resources is used to transmit the first information, or determine that the third resource in the first resources is not used to transmit the first information.

10. The method according to claim 7, wherein the configuration information comprises first configuration information, and when a configuration indicated by the first configuration information belongs to a first configuration set, the first configuration information indicates that the second resource in the first resources is used to transmit the first information.

11. The method according to claim 10, wherein the first configuration set comprises some or all of the following configurations:
a configuration in which a quantity of spatial layers of DMRSs is greater than N, wherein N is a positive integer; and
a configuration of an additional DMRS.

12. The method according to claim 7, wherein
the first resources are mapped to at least two time domain symbols, the first resources comprise one or more resources, except the fourth resource, mapped to a first symbol in the at least two time domain symbols and one or more resources, except the fourth resource, mapped to a second symbol in the at least two time domain symbols, wherein the one or more resources that are mapped to the first symbol are fifth resources, the one or more resources that are mapped to the second symbol are sixth resources, and the second resource is some or all of the fifth resources or the second resource is some or all of the sixth resources.

13. A terminal device, comprising:
a transceiver, configured to receive configuration information sent by a network device; and
a processor, configured to determine, based on the configuration information, that a second resource in first resources is used to transmit first information or that a third resource in first resources is not used to transmit first information, wherein the first resources are resources mapped to a demodulation reference signal (DMRS) port, wherein the first information includes at least one of the following information: data information, control information, and another reference signal different from a DMRS, and wherein the second resource includes some or all of the first resources except a fourth resource, the third resource includes some or all of the first resources except the fourth resource, and the fourth resource includes a resource corresponding to a DMRS port indicated by a DMRS port configuration received by the terminal device.

14. The terminal device according to claim 13, wherein the configuration information comprises first configuration information, the first configuration information is first indication information or second indication information, the first indication information indicates that the second resource in the first resources is used to transmit the first information, and the second indication information indicates that the third resource in the first resources is not used to transmit the first information.

15. The terminal device according to claim 13, wherein the configuration information comprises first configuration information and second configuration information, the first configuration information is first indication information or second indication information, in response to the first configuration information being the first indication information, the first indication information indicates that the second resource in the first resources is used to transmit the first information, in response to the first configuration information being the second indication information, the second indication information instructs the terminal device to receive the second configuration information, and the second configuration information is used to indicate that the second resource in the first resources is used to transmit the first information, or determine that the third resource in the first resources is not used to transmit the first information.

16. The terminal device according to claim 13, wherein the configuration information comprises first configuration information, and based on that a configuration indicated by the first configuration information belongs to a first configuration set, the first configuration information indicates that the second resource in the first resources is used to transmit the first information.

* * * * *

UNITED STATES PATENT AND TRADEMARK OFFICE
CERTIFICATE OF CORRECTION

| | |
|---|---|
| PATENT NO. | : 11,272,491 B2 |
| APPLICATION NO. | : 16/580888 |
| DATED | : March 8, 2022 |
| INVENTOR(S) | : Wu et al. |

It is certified that error appears in the above-identified patent and that said Letters Patent is hereby corrected as shown below:

On the Title Page

Attorney, Agent, or Firm (74): "Leydig, Voit & Maver, Ltd." should read -- Leydig, Voit & Mayer, Ltd. --.

Signed and Sealed this
Nineteenth Day of July, 2022

*Katherine Kelly Vidal*

Katherine Kelly Vidal
*Director of the United States Patent and Trademark Office*